United States Patent [19]

Katsuda et al.

[11] Patent Number: 4,814,619
[45] Date of Patent: Mar. 21, 1989

[54] STACKER FOR STIMULABLE PHOSPHOR SHEETS

[75] Inventors: Satoshi Katsuda; Shumpeita Torii, both of Kanagawa, Japan

[73] Assignee: Fuji Photo Film Co., Ltd., Kanagawa, Japan

[21] Appl. No.: 169,705

[22] Filed: Mar. 18, 1988

[30] Foreign Application Priority Data

Mar. 20, 1987 [JP] Japan .................................. 62-67303
Mar. 20, 1987 [JP] Japan .................................. 62-67304
Mar. 20, 1987 [JP] Japan .................................. 62-67305
Mar. 20, 1987 [JP] Japan .................................. 62-67306

[51] Int. Cl.$^4$ .......................................... G03B 42/00
[52] U.S. Cl. ................................. 250/327.2; 250/484.1
[58] Field of Search ............... 250/327.2 K, 327.2 J, 250/484.1 B; 378/173, 172

[56] References Cited

U.S. PATENT DOCUMENTS

| | | | |
|---|---|---|---|
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 364/515 |
| 4,387,428 | 6/1983 | Ishida et al. | 364/414 |
| 4,739,166 | 4/1988 | Yoshimura et al. | 250/327.2 |

FOREIGN PATENT DOCUMENTS

| | | | |
|---|---|---|---|
| 0219836 | 4/1987 | European Pat. Off. | 250/327.2 |
| 11395 | 2/1981 | Japan | 250/327.2 |
| 58-67240 | 4/1983 | Japan . | |
| 62-16666 | 1/1987 | Japan . | |
| 62-175380 | 8/1987 | Japan . | |

Primary Examiner—Janice A. Howell
Assistant Examiner—Constantine Hannaher
Attorney, Agent, or Firm—Sughrue, Mion, Zinn, Macpeak & Seas

[57] ABSTRACT

A stacker for stimulable phosphor sheets provided in a conveyance path of a sheet conveyance system comprises a stacker body provided with upright parallel partition plates, each of which has a vertical back surface and a front surface tapered to gradually project forward in the downward direction, and bottom plates each of which is provided at the lower end of each partition plate and moveable between a first position to receive the lower edge of the stimulable phosphor sheet entering between the partition plates and a second position moved to allow the stimulable phosphor sheet to fall by its weight. A feed-in device is provided above the stacker body for feeding the stimulable phosphor sheets conveyed by the sheet conveyance system into the stacker body, and a feed-out device is provided below the stacker body for receiving the stimulable phosphor sheet falling by its weight and transferring it to the sheet conveyance system. The stacker body is moved so that every space between the partition plates in the stacker body can be brought below the feed-in device and above the feed-out device.

25 Claims, 12 Drawing Sheets

F I G .1
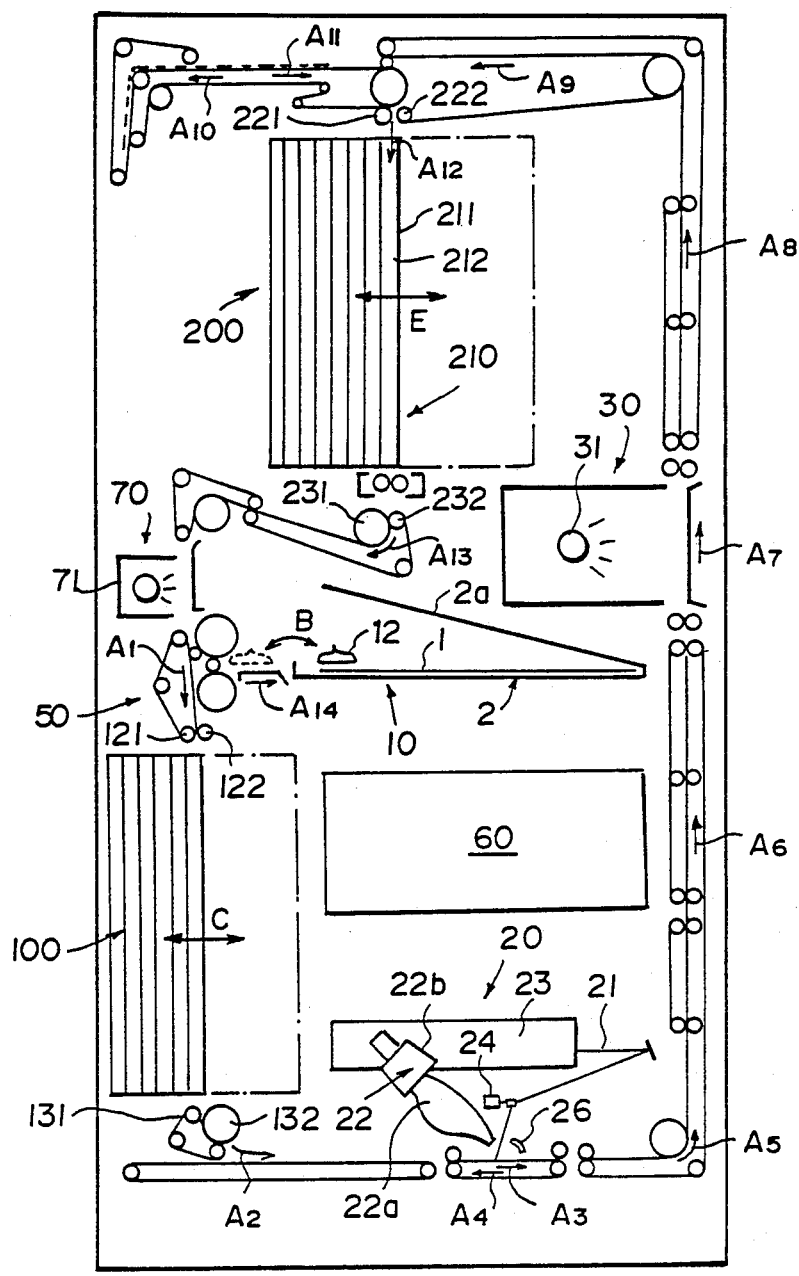

STACKER FOR STIMULABLE PHOSPHOR SHEETS

BACKGROUND OF THE INVENTION

1. Field of the Invention

This invention relates to a stacker for stimulable phosphor sheets which is provided in a conveyance path of a sheet conveyance means for conveying stimulable phosphor sheets in a radiation image read-out apparatus and which is capable of temporarily housing a plurality of the stimulable phosphor sheets therein and feeding out the housed sheets one by one. This invention particularly relates to a stacker for stimulable phosphor sheets which does not cause the radiation image read-out apparatus to become large.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet or simply as a sheet) is first exposed to a radiation passing through an object such as the human body to have a radiation image of the object stored thereon, and is then scanned with stimulating rays such as a laser beam which cause it to emit light in proportion to the stored radiation energy. The light emitted by the stimulable phosphor sheet upon stimulation thereof is photoelectrically detected and converted to electric image signals, and the radiation image of the object is reproduced as a visible image by use of the image signals on a recording material such as a photographic film, a display device such as a cathode ray tube (CRT), or the like.

In the aforesaid radiation image recording and reproducing system, the stimulable phosphor sheet is used to temporarily store a radiation image until the sheet is scanned with stimulating rays to read out the radiation image. Therefore, after the radiation image is read out from the stimulable phosphor sheet, radiation energy remaining thereon should be erased to reuse the sheet.

For satisfying this requirement, besides a radiation image read-out apparatus consisting of a read-out section for reading out an image stored on a stimulable phosphor sheet, there has heretofore been proposed a radiation image read-out apparatus provided with the read-out section and an erasing section for erasing radiation energy remaining on the sheet.

In the proposed radiation image read-out apparatus, a cassette housing a stimulable phosphor sheet carrying a radiation image stored thereon by use of an external image recording apparatus is generally fed to a cassette holding section. The stimulable phosphor sheet is taken out of the cassette, transferred to a sheet conveyance means, and conveyed by the sheet conveyance means to the read-out section. Also, in general, a stacker for temporarily housing a plurality of the stimulable phosphor sheets, feeding out the sheets one by one and transferring them to the sheet conveyance means is provided in the conveyance path between the cassette holding section and the read-out section. Specifically, a comparatively long time is taken for carrying out image read-out at the read-out section. Therefore, in the case where the stacker is provided, a plurality of image-recorded stimulable phosphor sheets can be introduced into the radiation image read-out apparatus while the image read-out is being carried out for a single stimulable phosphor sheet at the read-out section, and it is possible to eliminate the problem that the image-recorded sheet is made to wait for a long time in the form housed in the stacker at the cassette holding section. Also, in the case where the stacker is provided, even though the read-out section becomes defective and inoperable, image recording in an external image recording apparatus need not be stopped immediately, but instead the image recording apparatus can be operated continuously for some period.

On the other hand, in the radiation image read-out apparatus provided with the read-out section and the erasing section as mentioned above, the stimulable phosphor sheet on which the erasing has been finished at the erasing section is taken out of the read-out apparatus and reused for image recording. In general, a plurality of the erased reusable sheets are stacked in a stacking tray inside of the read-out apparatus, and taken out of the read-out apparatus in the form housed in the stacking tray. Since the sheets stacked in the stacking tray should be housed one by one in a cassette as mentioned above when they are to be reused for image recording, it is necessary to load the sheets one by one into a cassette prior to image recording. Therefore, a long time is taken for housing each sheet ready for image recording into a cassette and conducting image recording on the sheet, and it is not always possible to efficiently circulate and reuse the sheet. Also, though loading of the sheet into the cassette is carried out by use of a special-purpose loader or manually, the cost of the overall system increases in the case where the special-purpose loader is used, and manual loading is disadvantageous from the viewpoint of sheet processing since the sheet must be manually touched directly. The radiation image read-out apparatus may also be constituted so that the sheet is circulated therein, taken out of a cassette after image recording, subjected to image read-out and erasing, and then conveyed and housed in a cassette. However, with such a read-out apparatus, since the read-out apparatus is exclusively occupied by a single sheet until the sheet is housed in the cassette after image read-out and erasing are conducted on the sheet, processing of the next sheet cannot be started as long as processing of the preceding sheet is being conducted. Thus an unnecessarily long time is taken, and the processing capacity of the apparatus decreases markedly. Accordingly, in the radiation image read-out apparatus provided with the erasing section, it would be very advantageous if a stacker for temporarily housing the sheets therein and feeding out a single desired sheet among the housed sheets could be provided in the sheet conveyance means present on the downstream side of the erasing section.

Accordingly, in Japanese Patent Application No. 61(1986)-16074, the applicant proposed a stacker which is adapted to provision between a sheet feeding section such as a cassette holding section and a read-out section or between an erasing section and the cassette holding section, and which enables classification of the housed stimulable phosphor sheets in accordance with the sheet size and preferential feed-out of a specific sheet.

With reference to FIG. 16, the proposed stacker is disposed in a sheet conveyance means 450 and is provided with a tray unit 410 comprising a plurality of trays 411, 411, . . . each of which can house a single stimulable phosphor sheet therein. The tray unit 410 is moved by a unit movement means (not shown) in the direction as indicated by the arrow between the position as indicated by the solid line and the position as indicated by the chain line so that an arbitrary tray 411 faces the feed-in rollers 421 and 422 provided above the tray unit 410 and the feed-out rollers 431 and 432 provided below the tray unit 410. At the time the stimulable phosphor sheet is to be fed into the tray 411, the inclination of the tray 411 for receiving the sheet is changed so that the space between said tray 411 and the tray adjacent thereto increases. At the time the stimulable phosphor sheet is to be fed out of the tray unit 410, the tray 411 housing the sheet which is to be fed out is moved to the position above the feed-out rollers 431 and 432, a bottom plate 413 of the tray 411 is opened, so that the sheet is allowed to fall from the tray 411 and is transferred to the feed-out rollers 431 and 432. With the stacker constituted in this manner, each sheet is fed into an arbitrary tray, and an arbitrary sheet can be fed out of the tray unit 410. Therefore, a specific sheet can be fed out of the tray unit 410 and processed preferentially. Also, the sheets can be housed in the trays 411, 411, . . . by being classified in accordance with the sheet size, and a sheet of a required size can be fed out of the tray 411. Further, the stacker is adapted to the provision between the sheet feeding section and the read-out section or between the erasing section and the cassette holding section.

However, with the aforesaid stacker, each tray 411 is held in the condition inclined obliquely in order to facilitate feed-in and feed-out of the stimulable phosphor sheet and to support the sheet reliably. In the case where the movement range of the tray unit 410 is from the position as indicated by the solid line to the position as indicated by the chain line in FIG. 16, the width in the direction of the stacker movement which is required for moving the stacker is determined by the position P1 and the position P2 shown in FIG. 16. Therefore, in order to provide the stacker, it is necessary to provide a comparatively large space as compared with the width of the stacker itself, and the radiation image read-out apparatus as a whole becomes large.

SUMMARY OF THE INVENTION

The primary object of the present invention is to provide a stacker for stimulable phosphor sheets, which enables reduction in the movement space in a radiation image read-out apparatus and yet maintains the functions of preferential feed-out of a stimulable phosphor sheet and classification of the stimulable phosphor sheets in accordance with the sheet size.

Another object of the present invention is to provide a stacker for stimulable phosphor sheets, which feeds out a stimulable phosphor sheet by accurately adjusting the position of the sheet in accordance with the sheet size without the width of each sheet housing compartment being adjusted to a sheet of a specific size.

A further object of the present invention is to provide a stacker for stimulable phosphor sheets, which enables preferential feed-out of a stimulable phosphor sheet and classification of the stimulable phosphor sheets in accordance with the sheet size, and which simultaneously carries out feed-in and feed-out of the sheets.

The specific object of the present invention is to provide a stacker for stimulable phosphor sheets, which is made small by forming the sheet housing space approximately upright in the vertical direction, and which is free from the problem that a bottom plate is caused to open by the falling impact of a stimulable phosphor sheet.

The present invention provides, in a radiation image read-out apparatus for reading out a radiation image stored on a stimulable phosphor sheet, a stacker for stimulable phosphor sheets provided in a conveyance path of a sheet conveyance means for conveying said stimulable phosphor sheet and capable of housing therein a plurality of stimulable phosphor sheets and discharging the housed stimulable phosphor sheets one by one, the stacker for stimulable phosphor sheets comprising:

(i) a stacker body provided with:

(a) a plurality of partition plates disposed approximately upright in parallel relation to one another, each of which has an approximately vertical back surface and a front surface tapered so that said front surface is gradually projected forward in the downward direction, said partition plates being disposed in parallel relation to one another with a space, into which said stimulable phosphor sheet is to enter from above, intervening therebetween, and (b) bottom plates each of which is provided at the lower end of each of said partition plates and moveable between a first position to receive the lower edge of said stimulable phosphor sheet entering between said partition plates and hold said stimulable phosphor sheet and a second position moved from said first position to allow said stimulable phosphor sheet to fall by its weight, (ii) a feed-in means provided above said stacker body for feeding said stimulable phosphor sheets conveyed by said sheet conveyance means into said stacker body, (iii) a feed-out means provided below said stacker body for receiving said stimulable phosphor sheet falling by its weight and transferring said stimulable phosphor sheet to said sheet conveyance means, and (iv) a movement means for moving said stacker body so that every space between said partition plates in said stacker body can be brought below said feed-in means and above said feed-out means.

By the term "disposing partition plates in parallel relation to one another" as used herein is meant that the front surfaces of the partition plates are parallel with one another and the back surfaces thereof are parallel with one another. Also, the term "tapered front surface" or the term "vertical back surface" as used herein means that the front surface generally acts as a tapered surface with respect to the stimulable phosphor sheet or the back surface generally acts as a vertical surface with respect to the stimulable phosphor sheet. Specifically, recesses, openings and the like may be formed at a part of the front surface or at a part of the back surface.

The present invention also provides, in a radiation image read-out apparatus for reading out a radiation image stored on a stimulable phosphor sheet, a stacker for stimulable phosphor sheets provided in a conveyance path of a sheet conveyance means for conveying said stimulable phosphor sheet and capable of housing therein a plurality of stimulable phosphor sheets and discharging the housed stimulable phosphor sheets one by one, the stacker for stimulable phosphor sheets comprising:

(i) a stacker body provided with:

(a) a plurality of partition plates standing in approximately parallel relation to one another with a predetermined space, into which said stimulable phosphor sheet is to enter, intervening therebetween, and (b) bottom plates each of which is provided at the lower end of each of said partition plates and moveable between a first position to receive the lower edge of said stimulable phosphor sheet entering between said partition plates and hold said stimulable phosphor sheet and a second position moved from said first position to allow said stimulable phosphor sheet to fall by its weight, (ii) a feed-in means provided above said stacker body for feeding said stimulable phosphor sheets conveyed by said sheet conveyance means into said stacker body, (iii) a feed-out means provided below said stacker body for receiving said stimulable phosphor sheets one by one from said stacker body and transferring said stimulable phosphor sheets to said sheet conveyance means, (iv) a movement means for moving said stacker body with respect to said feed-in means and said feed-out means so that every space between said partition plates in said stacker body can face said feed-in means and said feed-out means, (v) a regulation plate provided in the vicinity of one side edge of said stacker body between said feed-out means and said stacker body, and (vi) a sheet position adjusting member moveable between a first position in the vicinity of the other side edge of said stacker body between said feed-out means and said stacker body, and a second position retracted from the position between said feed-out means and said stacker body, said sheet position adjusting member having a surface tapered so that said surface is gradually projected toward said regulation plate in the downward direction.

The second position of the sheet position adjusting member means a position at which the sheet position adjusting member does not interfere with the stimulable phosphor sheet falling by its weight from the stacker body regardless of the sheet size. In the case where the feed-out means is particularly large, the second position of the sheet position adjusting member may overlap a part of the feed-out means which does not directly carry out the feed-out. Also, the second position of the sheet position adjusting member may be set in front of or at the back of the first position of the sheet position adjusting member, i.e. in the direction of movement of the stacker body with respect to the feed-in means and the feed-out means, or may be set on the right or left side of the first position, as viewed in the direction of movement of the stacker body with respect to the feed-in means and the feed-out means. By the term "standing of partition plates" as used herein is meant such condition of the partition plates that the stimulable phosphor sheet can smoothly fall by its weight at the time of sheet feed-out. Specifically, the partition plates may stand upright in the vertical direction or may be inclined obliquely. In the latter case, the range of inclination may be determined in accordance with the material of the partition plates or the like.

The present invention further provides, in a radiation image read-out apparatus for reading out a radiation image stored on a stimulable phosphor sheet, a stacker for stimulable phosphor sheets provided in a conveyance path of a sheet conveyance means for conveying said stimulable phosphor sheet and capable of housing therein a plurality of stimulable phosphor sheets and discharging the housed stimulable phosphor sheets one by one, the stacker for stimulable phosphor sheets comprising:

(i) a stacker body provided with a plurality of sheet housing compartments each of which is capable of housing therein a single stimulable phosphor sheet, said sheet housing compartments being formed by a plurality of partition plates disposed in approximately parallel relation to one another, (ii) a feed-in means provided on one side of said stacker body for feeding said stimulable phosphor sheets conveyed by said sheet conveyance means into said stacker body, (iii) a feed-out means provided on the other side of said stacker body for receiving said stimulable phosphor sheets one by one from said stacker body and transferring said stimulable phosphor sheets to said sheet conveyance means, and (iv) a movement means for moving said stacker body so that every sheet housing compartment in said stacker body can face said feed-in means and said feed-out means, wherein said feed-in means and said feed-out means are deviated in position from each other so that said feed-in means and said feed-out means face said sheet housing compartments different from each other in said stacker body stopped at a predetermined position.

The present invention still further provides, in a radiation image read-out apparatus for reading out a radiation image stored on a stimulable phosphor sheet, a stacker for stimulable phosphor sheets provided in a conveyance path of a sheet conveyance means for conveying said stimulable phosphor sheet and capable of housing therein a plurality of stimulable phosphor sheets and discharging the housed stimulable phosphor sheets one by one, the stacker for stimulable phosphor sheets comprising:

(i) a stacker body provided with:

(a) a plurality of partition plates disposed upright approximately in the vertical direction in approximately parallel relation to one another with a predetermined space, into which said stimulable phosphor sheet is to enter, intervening therebetween, and (b) bottom plates each of which is provided at the lower end of each of said partition plates and moveable between a first position to receive the lower edge of said stimulable phosphor sheet entering between said partition plates and hold said stimulable phosphor sheet by being urged by a spring and a second position rotated downward from said first position by an opening means against the urging force of said spring to allow said stimulable phosphor sheet to fall by its weight, (ii) a feed-in means provided above said stacker body for feeding said stimulable phosphor sheets conveyed by said sheet conveyance means into said stacker body, (iii) a feed-out means provided below said stacker body for receiving said stimulable phosphor sheet falling by its weight and transferring said stimulable phosphor sheet to said sheet conveyance means, (iv) a movement means for moving said stacker body with respect to said feed-in means and said feed-out means so that every space between said partition plates in said stacker body can be brought below said feed-in means and above said feed-out means, and (v) a stopper disposed below said bottom plate that receives the lower edge of said stimulable phosphor sheet fed-in by said feed-in means, thereby to prevent said bottom plate from rotating from said first position, at least at the time said stimulable phosphor sheet is fed into said stacker body.

The term "a plurality of partition plates disposed upright approximately in the vertical direction" as used herein means that the partition plates are upright so that the stacker body stands erect without obliquely inclining as a whole. Insofar as this condition is maintained, slight tapers and recesses or protrusions may be formed on the partition plates.

The stacker for stimulable phosphor sheets in accordance with the present invention is not limited to such a configuration that the feed-in means and the feed-out means are fixed and the stacker body is moved with respect thereto, and may be constituted so that the stacker body is fixed and the feed-in means and the feed-out means are moved.

With the first- to fourth-mentioned stackers for stimulable phosphor sheets in accordance with the present invention, feeding of the stimulable phosphor sheets into the respective sheet housing compartments and feeding of the stimulable phosphor sheets out of the sheet housing compartments can be carried out in every sequence, and processing such as read-out and erasing can be carried out preferentially for a specific stimulable phosphor sheet. Also, the stacker can be provided between the erasing section and the cassette holding section.

Also, with the first-mentioned stacker for stimulable phosphor sheets in accordance with the present invention, the stacker as a whole can be formed approximately upright, thereby to decrease the movement range of the stacker and to prevent the radiation image read-out apparatus from becoming large even though the stacker is provided. Also, with the first-mentioned stacker for stimulable phosphor sheets in accordance with the present invention wherein the surfaces of the partition plates are formed as tapered surfaces, the feed-in and feed-out of the stimulable phosphor sheets can be carried out smoothly with the openings through which the sheets are to be fed-in being maintained wide, and the sheets can be held reliably in the stacker.

Specifically, in order to make small the movement space of the conventional stacker wherein the obliquely inclined trays are provided side by side and the whole tray unit for housing the stimulable phosphor sheets therein is inclined, the trays or the like may be erected so that the sheet housing spaces are upright in the vertical direction. However, in the case where the sheets are fed into the upright spaces, sheet feed-in cannot be carried out smoothly as compared with the case where the sheets are fed into the obliquely inclined trays. Also, the sheets may incline in the housing spaces, and cannot be held reliably. Accordingly, tapered surfaces should be formed to a practicable extent in the upright sheet housing spaces, so that smooth sheet feed-in and feed-out are achieved to some extent with the stacker movement space being decreased. With the first-mentioned stacker for stimulable phosphor sheets in accordance with the present invention wherein the partition plates each having the vertical back surface and the tapered front surface are provided and disposed side by side in parallel relation to one another, the sheet housing spaces as mentioned above can be formed. The tapered surface may be formed in such an inclination that the space of the upper opening of each housing space is nearly equal to the space between the trays in the conventional stacker, and the space of the lower opening is nearly equal to the thickness of the stimulable phosphor sheet. With the first-mentioned stacker for stimulable phosphor sheets in accordance with the present invention constituted in this manner, the space required for movement of the stacker can be decreased without the number of the stimulable phosphor sheets capable of being housed in the stacker being changed, and the sheets can be fed-in and fed-out smoothly and held in the stacker reliably.

With the second-mentioned stacker for stimulable phosphor sheets in accordance with the present invention wherein the position of the stimulable phosphor sheet is adjusted by the regulation plate and the sheet position adjusting member disposed outside of the stacker body, each sheet housing compartment between the partition plates can be formed to match the width of the largest one among the stimulable phosphor sheets which are to be fed-in, and the sheet of every size can be housed in the sheet housing compartment. Also, the sheet position adjusting member may be retracted to its second position in the case where the sheet fed out of the sheet housing compartment is large and may be moved to its first position in the case where the sheet fed out of the sheet housing compartment is small, thereby to guide the sheet to the position at which the side edge of the sheet contacts the regulation plate and to adjust the position of the sheet accurately by the tapered surface of the sheet position adjusting member.

Accordingly, with the second-mentioned stacker for stimulable phosphor sheets in accordance with the present invention, adjustment of the position of a small sheet can be carried out by the regulation plate and the sheet position adjusting member in the same manner as the adjustment of the position of a large sheet. Also, since the regulation plate and the sheet position adjusting member are provided below the stacker body and each sheet housing compartment need not be provided with the function of sheet position adjustment, the sheet of every size can be housed in the sheet housing compartment. Therefore, with the radiation image read-out apparatus provided with the second-mentioned stacker for stimulable phosphor sheets in accordance with the present invention, processing can be achieved efficiently regardless of the size of the sheet which is introduced into the apparatus.

With the third-mentioned stacker for stimulable phosphor sheets in accordance with the present invention wherein the stacker body provided with the sheet housing compartments each of which is capable of housing a single sheet is moved so that every sheet housing compartment faces the feed-in means and the feed-out means, the sheets can be housed in the sheet housing compartments by being classified in accordance with the sheet size, and a specific sheet among the housed sheets can be preferentially fed out of the stacker.

Also, with the third-mentioned stacker for stimulable phosphor sheets in accordance with the present invention wherein the feed-in means and the feed-out means are deviated in position from each other, sheet feed-in and feed-out can be carried out simultaneously for the sheet housing compartments different from each other by use of the feed-in means and the feed-out means. Accordingly, sheet feed-in and feed-out can be carried out efficiently, and the sheets can be processed quickly in the radiation image readout apparatus wherein the stacker is employed.

With the fourth-mentioned stacker for stimulable phosphor sheets in accordance with the present invention wherein the partition plates are disposed upright approximately in the vertical direction and the sheet housing compartments are formed approximately upright, the movement space of the stacker can be made small even in the case where the stacker body is moved to select the sheet housing compartment, and the radiation image read-out apparatus wherein the stacker is provided can be prevented from becoming large. Also, even though the sheet housing compartments are formed upright and the falling impact of the sheet at the time of sheet feed-in increases, the stopper provided below the bottom plate prevents the bottom plate from being opened by the falling impact of the sheet. Therefore, the sheet can be held reliably in the sheet housing compartment.

BRIEF DESCRIPTION OF THE DRAWINGS

FIG. 1 is a schematic side view showing the radiation image read-out apparatus wherein an embodiment of the stacker for stimulable phosphor sheets in accordance with the present invention is employed.

DESCRIPTION OF THE PREFERRED EMBODIMENTS

Figure 2:
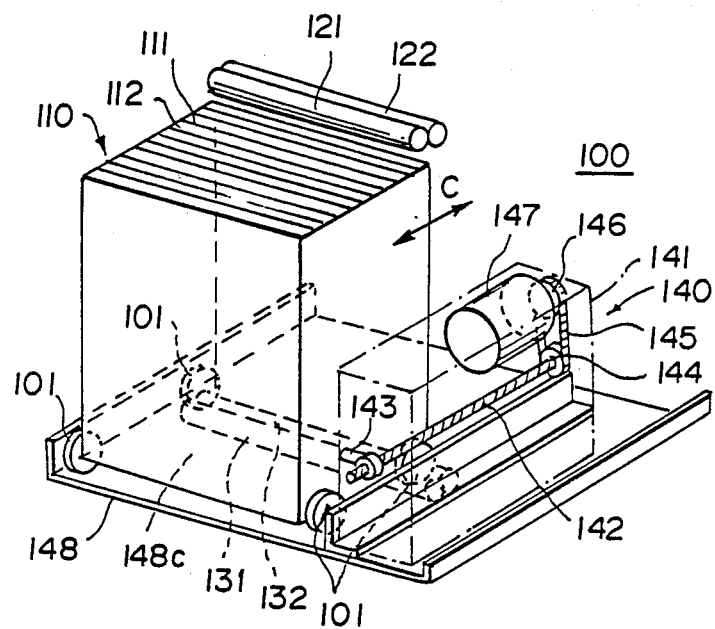
FIG. 2 is a perspective view showing the stacker employed in FIG. 1.

The present invention will hereinbelow be described in further detail with reference to the accompanying drawings.

Referring to FIG. 1, a radiation image read-out apparatus wherein an embodiment of the stacker for stimulable phosphor sheets in accordance with the present invention is employed is provided with a cassette holding section 10 for releasably holding a cassette 2 capable of housing a stimulable phosphor sheet (hereinafter simply referred to as a sheet) 1 therein, a read-out section 20 for reading out a radiation image stored on the sheet 1, and an erasing section 30 for erasing radiation energy remaining on the sheet 1 after image read-out is conducted thereon. The sheet 1 is subjected to image recording in an external image recording apparatus (not shown) in the form house in the cassette 2, and the cassette 2 housing the sheet 1 is fed to the cassette holding section 10. The cassette 2 is light-tight so that the sheet 1 is prevented from exposure to external light when it is exposed to a radiation to have a radiation image recorded thereon. The cassette 2 is loaded at an angle normal to the drawing sheet in FIG. 1 into the apparatus from the front face thereof. The cassette 2 is provided with an openable cover member 2a. When the cassette 2 is fed into the cassette holding section 10, the cover member 2a is maintained in the closed position. At the time the loading of the cassette 2 into the apparatus has been finished, the cover member 2a is opened as shown and the sheet 1 housed in the cassette 2 is laid bare. After the cassette 2 is opened, a suction cup 12 advances into the cassette 2 and takes the sheet 1 out of the cassette 2 by moving in the direction as indicated by the arrow B. The sheet 1 has been held in the cassette 2 with a front surface provided with a stimulable phosphor layer facing down.

The radiation image read-out apparatus shown in FIG. 1 is provided with a sheet conveyance means 50 composed of endless belts, rollers, guide plates and other members for receiving the sheet 1 taken out of the cassette 2 in the manner as mentioned above and conveying the sheet 1 to the read-out section 20 and the erasing section 30 in this sequence. The sheet 1 taken out of the cassette 2 by the suction cup 12 is sent by the sheet conveyance means 50 in the direction as indicated by the arrow A1.

A first stacker 100 as an embodiment in accordance with the present invention is provided in the conveyance path of the sheet conveyance means 50 between the cassette holding section 10 and the read-out section 20. Before the sheet 1 conveyed in the direction as indicated by the arrow A1 is sent to the read-out section 20, it is temporarily housed in the first stacker 100. The configuration of the first stacker 100 will hereinbelow be described in detail with reference to FIGS. 2 to 6.

With reference to FIG. 2, the first stacker 100 is provided with a plurality of partition plates 111, 111, ... disposed approximately upright in parallel relation to one another, so that a single sheet 1 can be housed in each of sheet housing compartments 112, 112, ... constituted by the spaces formed among the partition plates 111, 111, ... The first stacker 100 is constituted by a case-like stacker body 110 provided with the partition plates 111, 111, ... and capable of moving integrally therewith, feed-in rollers 121 and 122 as a feed-in means for feeding the sheet 1 into the stacker body 110, feed-out rollers 131 and 132 as a feed-out means for receiving the sheet 1 discharged from the stacker body 110 and transferring the sheet 1 to the sheet conveyance means 50, and a movement means 140 for moving the stacker body 110 in the direction as indicated by the arrow C so that every sheet housing compartment 112 can face the feed-in rollers 121 and 122 and the feed-out rollers 131 and 132. The movement range of the stacker body 110 is from the position as indicated by the solid line to the position as indicated by the chain line in FIG. 1.

Figure 3:
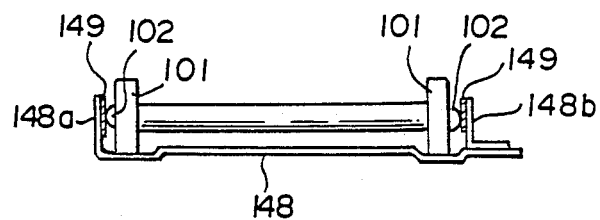
FIG. 3 is a schematic view showing the relationship between the wheel shaft and the base plate of the stacker employed in FIG. 1.

A drive unit 141 is provided in the horizontal relation to the stacker body 110. The drive unit 141 comprises a screw rod 142 extending in the direction of movement of the stacker body 110, a stacker body supporting member 143 projecting laterally from the side face of the stacker body 110 and engaging with the screw rod 142, a gear 144 secured to the screw rod 142, a gear 146 coupled with the gear 144 via a belt 145, and a pulse motor 147 for rotating the gear 146 in two directions. The screw rod 142 is rotated by the motor 147 of the drive unit 141 via the gears 146 and 144, thereby to reciprocally moving the stacker body 110 in the direction as indicated by the arrow C. Four wheels 101, 101, . . . are provided on the side faces of the stacker body 110 for movement on a base plate 148 provided below the stacker body 110, whereby the stacker body 110 is moved in the direction as indicated by the arrow C under the control by the drive unit 141. In this embodiment, the movement means 140 is constituted by the drive unit 141 and the base plate 148. As shown in FIG. 3, the base plate 148 is provided with upwardly projecting guide members 148a and 148b which are formed in the direction of movement of the stacker body 110 on both sides of the stacker body 110. Each of the shafts of the wheels 101, 101, . . . has spherical extremities 102, 102, and the wheels 101, 101, . . . rotate with the shaft extremities 102, 102, . . . contacting the guide members 148a and 148b. Therefore, in the case where the distance between the guide members 148a and 148b is adjusted accurately to match the length of the wheel shaft, it is possible to prevent the problem that the stacker body 110 is distorted in the course of the movement and the stopping position of the stacker body 110 becomes incorrect or the movement of the stacker body 110 becomes unstable. In the course of adjustment of the distance between the guide members 148a and 148b, the shaft extremity 101 may be made to contact the guide member 148a formed integrally with one base plate 148, and the position of the other guide member 148b may be adjusted to match the opposite shaft extremity 101. Also, in this embodiment, a sliding material such as "Polyslider" is provided on the inner surfaces of the guide members 148a and 148b, and therefore the stacker body 110 can be moved more smoothly.

The feed-in rollers 121 and 122 are provided above the stacker body 110. The feed-in rollers 121 and 122 may be of any type insofar as they can feed the sheet 1 conveyed by the sheet conveyance means 50 into the stacker body 110. Thus the feed-in rollers 121 and 122 may be formed integrally with the sheet conveyance means 50 as shown in FIG. 1, or may be formed independently of the sheet conveyance means 50.

As the stacker body 110 is moved in the direction as indicated by the arrow C, the sheet housing compartment 112 that is positioned below the feed-in rollers 121 and 122 changes. The feed-in rollers 121 and 122 feed the sheet 1 into the sheet housing compartment 112 positioned below the feed-in rollers 121 and 122. The configuration of the stacker body 110 will hereinbelow be described with reference to FIGS. 4 and 5.

Figure 4:
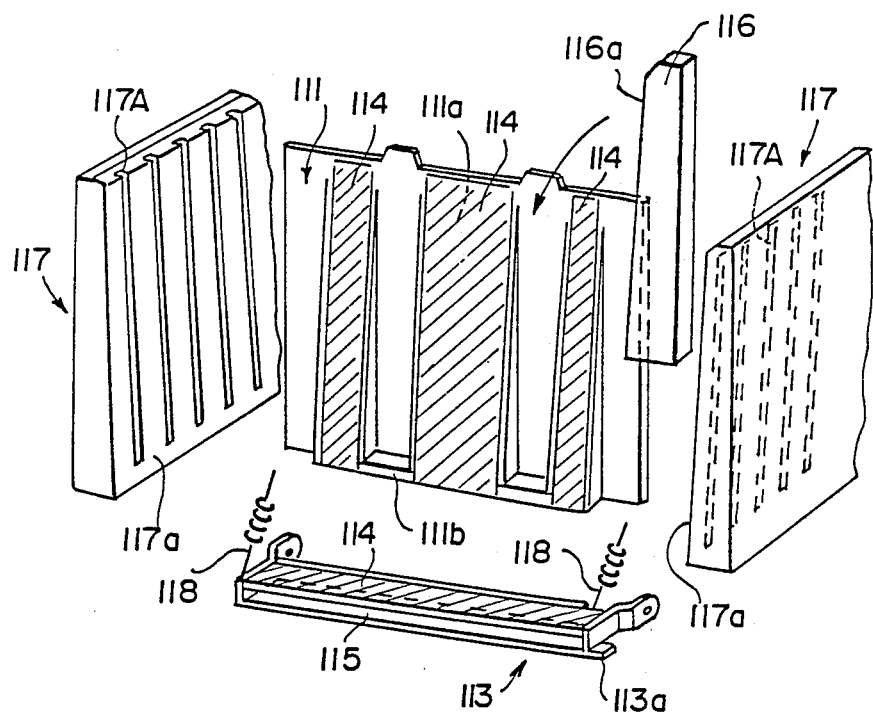
FIG. 4 is a perspective developed view showing the stacker body of the stacker employed in FIG. 1.
Figure 5:
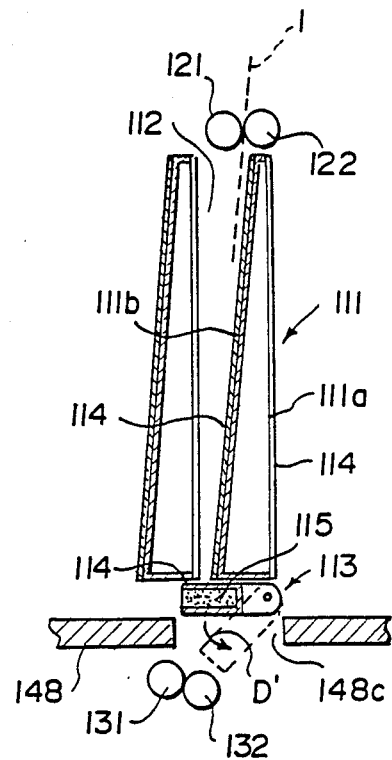
FIG. 5 is a sectional view showing the major part of the stacker body shown in FIG. 4.

With reference to FIG. 4, the partition plate 111 has a vertical back surface 111a and a front surface 111b tapered so that the front surface 111b is gradually projected forward in the downward direction. The partition plate 111 is held with both edges thereof being supported by sheet position adjusting plates 117, 117. Specifically, each of the sheet position adjusting plates 117, 117 has an inner surface 117a provided with grooves 117A, 117A, . . . for receiving a plurality of the partition plates 111, 111, . . . at predetermined intervals. Both edges of each of the partition plates 111, 111, . . . are inserted into the grooves 117A, 117A of the sheet position adjusting plates 117, 117 opposite to each other, so that the partition plates 111, 111, . . . are held integrally with the sheet position adjusting plates 117, 117. Also, the inner surface 117a of each of the sheet position adjusting plates 117, 117 is tapered so that the inner surface 117a is gradually projected inward in the downward direction, thereby to regulate the position of the sheet 1, which is fed into the sheet housing compartment 112, in the width direction of the sheet 1. A bottom plate 113 is provided at the lower end of each of the partition plates 111, 111, . . . The bottom plate 113 is moveable between a first position to receive the lower edge of the sheet 1 fed-in along the partition plate 111 and hold the sheet 1, and a second position rotated downward from the first position to allow the sheet 1 to fall by its weight. As shown in FIG. 5, the sheet housing compartment 112 is defined by the front surface 111b of the partition plate 111, the bottom plate 113, and the back surface 111a of the adjacent partition plate 111 facing said front surface 111b.

At the time the sheet 1 is fed by the feed-in rollers 121 and 122 into the stacker body 110 as mentioned above, the sheet 1 advances along the tapered front surface 111b into the sheet housing compartment 112 with the position of the sheet 1 being adjusted by the sheet position adjusting plates 117, 117. As shown in FIG. 4, a part of the front surface 111b and a part of the back surface 111a of the partition plate 111 are alternately recessed rearward with reference to the tapered surface and the vertical surface. In the case where the recesses and protrusions are formed on the front and back surfaces of the partition plate 111, the sheet 1 can move smoothly without closely contacting the front and back surfaces. Also, in this embodiment, the partition plate 111 is formed of aluminium, and sliding members 114, 114, ... formed of a leather-grained polypropylene material or the like are provided on the protrusions of the front surface 111b and the back surface 111a for improving the sliding condition of the sheet 1 and preventing the surfaces of the sheet 1 from being scratched. The sheet housing compartment 112 is narrowed in the downward direction, and the space of the lower opening thereof is nearly equal to the thickness of a single sheet 1. At the time the upper edge of the sheet 1 fed-in by the feed-in rollers 121 and 122 leave the feed-in rollers 121 and 122, the sheet 1 falls by its weight. The bottom plate 113 receives the lower edge of the falling sheet 1 and holds the sheet 1 in the sheet housing compartment 112. A cushioning material 115 formed of sponge or the like for relieving the falling impact of the sheet 1 is provided on the bottom plate 113, and the sliding member 114 formed of a leather-grained polypropylene material or the like is provided on the cushioning material 115 for smoothly feeding out the sheet 1 as will be described later. Also, the stacker body 110 is capable of housing therein the sheets of a plurality of sizes, and is provided with a sheet position adjusting member 116 which is inserted into the sheet housing compartment 112 to reduce the effective width of the sheet housing compartment 112 at the time a comparatively small sheet 1 is fed-in. Specifically, the size of the sheet 1 taken out of the cassette 2 is detected by a sensor or the like, and the sheet position adjusting member 116 is inserted into the sheet housing compartment 112 from above in the case where the detected sheet size is small. The sheet position adjusting member 116 has a side surface 116a tapered so that the side face 116a is projected inward in the downward direction. The fed-in small sheet 1 is guided into the sheet housing compartment 112 with its position being adjusted by the inner surface 117a of one of the sheet position adjusting plates 117, 117 and the side surface 116a of the sheet position adjusting member 116. A plurality of sheet position adjusting members 116, 116, . . . may be provided in accordance with the kinds of the sheets which are to be fed into the stacker body 110.

Figure 6:
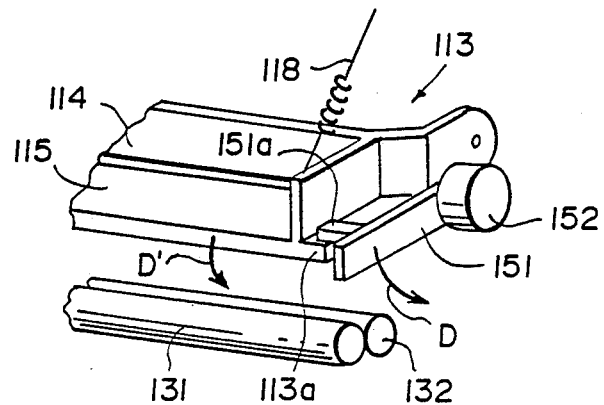
FIG. 6 is a perspective view showing the mechanism for taking the stimulable phosphor sheet out of the stacker body.

Feed-in of the sheet 1 taken out of the cassette 2 into the stacker body 110 is carried out in the manner as mentioned above. The sheets 1, 1, . . . housed sequentially in the stacker body 110 are then fed out of the stacker body 110 one by one, transferred to the sheet conveyance means 50, and sent to the read-out section 20. The feed-out rollers 131 and 132 are provided below the stacker body 110. As shown in FIGS. 2 and 5, a slit 148c through which the sheet 1 discharged from the stacker body 110 is to pass is formed in the base plate 148 at the position between the stacker body 110 and the feed-out rollers 131 and 132. At the time the sheet 1 is to be discharged from the stacker body 110, the stacker body 110 is moved by the movement means 140 until the sheet housing compartment 112 that houses the sheet 1 which is to be fed out is brought above the feed-out rollers 131 and 132. As shown in FIG. 4, the bottom plate 113 is connected with the partition plate 111 by springs 118, 118, and is normally maintained at the first position by the urging force of the springs 118, 118. On the other hand, a protrusion 113a is formed on a side edge of the bottom plate 113. Also, as shown in FIG. 6, a lever 151 having a protrusion 151a and rotatable by a drive means 152 constituted by a rotary solenoid or the like in the direction as indicated by the arrow D is provided in the vicinity of the feed-out rollers 131 and 132. At the time the sheet 1 is to be discharged from the sheet housing compartment 112, the protrusion 151a of the lever 151 is engaged with the protrusion 113a of the bottom plate 113, and the lever 151 is rotated in the direction as indicated by the arrow D, thereby to rotate the bottom plate 113 in the direction as indicated by the arrow D' with the spring 118 being expanded. As a result, the bottom plate 113 is moved to its second position as indicated by the broken line in FIG. 5, and the sheet 1 in the sheet housing compartment 112 is allowed to fall by its weight. The feed-out rollers 131 and 132 grasp the leading edge of the falling sheet 1, convey the sheet 1, and transfer it to the sheet conveyance means 50 in the vicinity of the feed-out rollers 131 and 132. When feed-out of the sheet 1 from the sheet housing compartment 112 is finished, the lever 151 is returned to the position as shown in FIG. 6, and the bottom plate 113 is returned by the returning force of the spring 118 to the position as indicated by the solid line in FIG. 5.

With the first stacker 100 in accordance with the present invention, the sheet 1 taken out of the cassette 2 is housed in the sheet housing compartment 112 of the stacker body 110, and the sheets 1, 1, . . . sequentially fed into the sheet housing compartments 112, 112, . . . in this manner can be fed out of the sheet housing compartments 112, 112, . . . one by one in every sequence regardless of the sequence of feed-in of the sheets 1, 1, . . . . In the case where a specific sheet 1 is to be sent to the read-out section 20 for processing most preferentially, the sheet 1 can be fed out of the sheet housing compartment 112 by the feed-out rollers 131 and 132 immediately after the sheet 1 has been fed into the sheet housing compartment 112 by the feed-in rollers 121 and 122. Also, in the case where the sizes of the fed-in sheets 1, 1, . . . are determined in advance for the respective sheet housing compartments 112, 112, . . . or the sizes of the sheets 1, 1, . . . fed into the sheet housing compartments 112, 112, . . . are stored in a memory, the sheet 1 of a desired size can be taken out of the corresponding sheet housing compartment 112 and sent to the read-out section 20. Further, with the first stacker 100 wherein the sheets 1, 1, . . . are housed in the sheet housing compartments 112, 112, . . . each of which is formed between the tapered front surface 111b of the partition plate 111 and the vertical back surface 111a of the adjacent partition plate 111, the stacker body 110 as a whole can be provided in the standing position, and the size of the sheet feed-in opening can be maintained equal to the size in the conventional stacker with the space between the vertical back surfaces 111a and 111a of the partition plates 111 and 111 adjacent to each other being equal to the space between the adjacent trays in the conventional stacker. Also, feed-in and feed-out of the sheet 1 can be carried out smoothly by the provision of the tapered surface formed so that the space of the lower opening of the sheet housing compartment 112 decreases.

As shown in FIG. 1, the sheet 1 discharged from the first stacker 100 in the manner as mentioned above is transferred by the feed-out rollers 131 and 132 to the sheet conveyance means 50, conveyed by the sheet conveyance means 50 in the direction as indicated by the arrow A2 into the read-out section 20.

At the read-out section 20, the sheet 1 carrying a radiation image stored thereon is scanned with stimulating rays 21 such as a laser beam which cause the sheet 1 to emit light in proportion to the stored radiation energy, and the emitted light is photoelectrically detected by a photoelectric read-out means 22 constituted by a photomultiplier or the like to obtain electric image signals for use in reproduction of a visible image. Reference numeral 23 denotes a stimulating ray source, and reference numeral 24 denotes a light deflector such as a galvanometer mirror. Reference numeral 26 designates a reflection mirror for reflecting the light emitted by the sheet 1 towards a light guide member 22a of the photoelectric read-out means 22. The light guide member 22a guides the light through total reflection therein up to a photodetector 22b constituted by a photomultiplier or the like.

The sheet 1 sent to the read-out section 20 is conveyed by the sheet conveyance means 50 in the direction as indicated by the arrow A3, and the whole surface of the sheet 1 is scanned two-dimensionally by the stimulating rays 21 deflected approximately normal to the conveyance direction. The light emitted by the sheet 1 during the scanning is detected by the photodetector 22b via the light guide member 22a. Image read-out is conducted in this manner.

As for the radiation image read-out, there has heretofore been known a method wherein preliminary read-out for approximately ascertaining the radiation image stored on the sheet 1 is conducted prior to the aforesaid image read-out (final read-out) for obtaining electric image signals for use in reproduction of a visible image, image read-out conditions for the final read-out or the like are adjusted based on the information obtained by the preliminary read-out, and the final read-out is carried out by use of the adjusted read-out conditions.

As disclosed in, for example, Japanese Unexamined Patent Publication No. 58(1983)-67240, the preliminary readout may be conducted by scanning the sheet 1 with stimulating rays having stimulation energy of a level lower than the level of the stimulation energy of the stimulating rays used in the final read-out, and detecting the light emitted by the sheet 1 during the scanning by a photoelectric read-out means.

The read-out section 20 may be constituted to conduct only the final read-out or both the preliminary read-out and the final read-out. For example, the preliminary read-out may be conducted by conveying the sheet 1 in the direction as indicated by the arrow A3, and the final read-out may then be carried out by reversely conveying the sheet 1 in the direction as indicated by the arrow A4 to the read-out start position, and then conducting the final read-out while the sheet 1 is again conveyed in the direction as indicated by the arrow A3. The optical members at the read-out section 20 are not limited to those mentioned above. For example, a long photomultiplier may be disposed along the main scanning line as the photoelectric read-out means as disclosed in Japanese Unexamined Patent Publication No. 62(1987)-16666, and the light emitted by the sheet 1 may be detected thereby.

Though a comparatively long time is taken for carrying out the image read-out at the read-out section 20, since the radiation image read-out apparatus is provided with the first stacker 100, it is possible to convey the sheets 1, 1, ... carrying a radiation image stored thereon sequentially into the first stacker 100 while image read-out is being carried out for a single sheet 1, and thereby to process the sheets 1, 1, ... very efficiently.

After image read-out from the sheet 1 is finished at the read-out section 20, the sheet 1 is conveyed by the sheet conveyance means 50 in the directions as indicated by the arrows A5 and A6 to the erasing section 30.

At the erasing section 30, radiation energy remaining on the sheet 1 after the image read-out is conducted is erased. Specifically, a part of the radiation energy stored on the sheet 1 at the image recording step remains stored thereon after the image read-out is carried out. In order to reuse the sheet 1, the residual radiation energy is erased at the erasing section 30. For this purpose, any erasing method may be employed. In this embodiment, the erasing section 30 is provided with a plurality of erasing light sources 31, 31, ... constituted by fluorescent lamps, tungsten-filament lamps, sodium lamps, xenon lamps, iodine lamps or the like, and the sheet 1 is exposed to the erasing light emitted by the erasing light sources 31, 31, ... for releasing the residual radiation energy from the sheet 1 while the sheet 1 is being conveyed in the direction as indicated by the arrow A7.

After erasing of the sheet 1 is finished at the erasing section 30, the erased reusable sheet 1 is conveyed in the direction as indicated by the arrow A8 and then in the directions as indicated by the arrows A9 and A10. After the erased reusable sheet 1 is conveyed in the direction as indicated by the arrow A10 up to the position indicated by the broken line in FIG. 1, the erased reusable sheet 1 is switched back and reversely conveyed in the direction as indicated by the arrow A11 and then in the direction as indicated by the arrow A12 into a second stacker 200. The second stacker 200 has a configuration similar to the first stacker 100. In the second stacker 200, a stacker body 210 comprising sheet housing compartments 212, 212, ... defined by a plurality of partition plates 211, 211, ... is moved in the direction as indicated by the arrow E for receiving the erased reusable sheet 1 into either one of the sheet housing compartments 212, 212, ... Feed-in rollers 221 and 222 as the feed-in means for the erased reusable sheet 1 are provided above the stacker body 210, and feed-out rollers 231 and 232 as the feed-out means for the erased reusable sheet 1 are provided below the stacker body 210. The feed-out rollers 231 and 232 receive the erased reusable sheet 1 fed out of the stacker body 210, and transfer the erased reusable sheet 1 to the sheet conveyance means 50 which conveys the erased reusable sheet 1 into the empty cassette 2 loaded at the cassette holding section 10. Before the erased reusable sheet 1 is fed into the second stacker 200, a plurality of the sheets 1, 1, ... have already been housed in the second stacker 200. Specifically, feed-out of the erased reusable sheet 1 from the second stacker 200 is carried out by the same mechanism as in the case of the first stacker 100, and every sheet 1 can be selectively fed out of the second stacker 200. The feed-out of the erased reusable sheet 1 is carried out immediately after an erased reusable sheet 1 suitable for the cassette 2 loaded at the cassette holding section 10 is selected from among the erased reusable sheets 1, 1, ... housed in the second stacker 200 and an image-recorded sheet 1 is taken out of the cassette 2 in the manner as mentioned above. In the case where the second stacker 200 is provided, a new sheet 1 can be conveyed into the empty cassette 2 within a short time interval after a cassette 2 housing an image-recorded sheet 1 is fed to the cassette holding section 10 and the image-recorded sheet 1 is taken out of the cassette 2. The cassette 2 loaded with the new sheet 1 can immediately be taken out of the cassette holding section 10 and can be sent to an external image recording apparatus for carrying out the image recording. In the case where the size of the sheet 1 held in the cassette 2 differs among the cassettes 2, 2, ..., since the sheets 1, 1, ... having different sizes may be held in advance at the second stacker 200 and may be selectively fed out of the second stacker 200 in accordance with the size of the cassette 2 fed to the cassette holding section 10, it is possible to circulate and reuse the sheets 1, 1, ... efficiently regardless of the sheet sizes. In order to maintain the sheets 1, 1, ... having different sizes in advance in the second stacker 200, they may be collected into the second stacker 200 without carrying out the sheet take-out therefrom for a while after the operation of the read-out apparatus is started, or unexposed sheets 1, 1, ... having different sizes may be loaded into the second stacker 200 before the operation of the apparatus is started. In order to select a sheet 1 having a size suitable for the cassette 2 fed to the cassette holding section 10 and take it out of the second stacker 100, it is necessary to use a control means for memorizing the sizes of the sheets 1, 1, ... housed in the sheet housing compartments 212, 212, ... of the second stacker 200 and controlling the selection and taking-out of a sheet 1 having a size suitable for the cassette 2 fed to the cassette holding section 10. For this purpose, the radiation image read-out apparatus is provided with a control section 60 disposed above the read-out section 20. The control section 60 also controls the sheet housing, sheet feed-in and sheet feed-out at the first stacker 100.

The erased reusable sheet 1 discharged from the second stacker 200 in the manner as mentioned above is conveyed by the sheet conveyance means 50 in the direction as indicated by the arrow A13 to the cassette holding section 10. The sheet 1 conveyed into the cassette 2 at the cassette holding section 10 is exposed to erasing light emitted by an erasing light source 71 at an auxiliary erasing section 70 provided in the sheet conveyance means 50 since it may occur that the sheet 1 has been maintained at the second stacker 200 before the cassette 2 is fed to the cassette holding section 10 and a long time has elapsed after the sheet 1 was subjected to erasing at the erasing section 30. Specifically, when at least a predetermined time elapses after erasing is conducted on the stimulable phosphor sheet 1, the sheet 1 stores energy of radiations emitted by radioactive isotopes such as Ra226 and K40, which are contained in a trace amount in the stimulable phosphor, or energy of environmental radiations such as cosmic rays and X-rays emitted by other X-ray sources. These types of radiation energy undesirably stored on the sheet 1 cause noise in a radiation image recorded next on the sheet 1. In order to prevent noise generation, the sheet 1 is passed under the auxiliary erasing section 70 for carrying out erasing (i.e. secondary erasing) by releasing the radiation energy stored on the sheet 1 while the sheet 1 was being maintained at the second stacker 200. The sheet 1 passing through the auxiliary erasing section 70 is conveyed by the sheet conveyance means 50 in the direction as indicated by the arrow A14, and is conveyed by the suction cup 12 into the cassette 2.

The stacker 200 in accordance with the present invention is provided between the erasing section 30 and the cassette holding section 10 in the radiation image read-out apparatus provided with the erasing section 30. In this case, even though the cassettes 2, 2, ... housing the image-recorded sheets 1, 1, ... of different sizes are fed sequentially to the cassette holding section 10, the cassette 2 need not be made to wait at the cassette holding section 10 until the sheet 1 taken out of the cassette 2 is returned to the cassette 2, but instead a new sheet 1 can immediately be conveyed into the empty cassette 2. Therefore, the sheets 1, 1, ... can be circulated and reused efficiently.

The configuration of the stacker for stimulable phosphor sheets in accordance with the present invention is not limited to the aforesaid embodiment. For example, instead of carrying out the movement of the bottom plate 113 between its first and second positions by rotating the bottom plate 113 around the edge thereof, a recess for receiving the bottom plate may be formed at the lower end of the partition plate, and the bottom plate may be moved linearly between the position to receive the lower edge of the sheet 1 and the position housed in the recess. Also, the member for integrally supporting a plurality of the partition plates from side edges of the partition plates and the member for adjusting the sheet position may be provided independently of each other. The sliding members and the cushioning material, and the recesses and protrusions on the front and back surfaces of the partition plates may be omitted in accordance with various conditions such as the material of the partition plates and the inclination of the tapered surface.

Another embodiment of the stacker for stimulable phosphor sheets in accordance with the present invention will hereinbelow be described with reference to FIGS. 7 to 10. In FIGS. 7 to 10, similar elements are numbered with the same reference numerals with respect to FIGS. 1 to 6.

Figure 7:
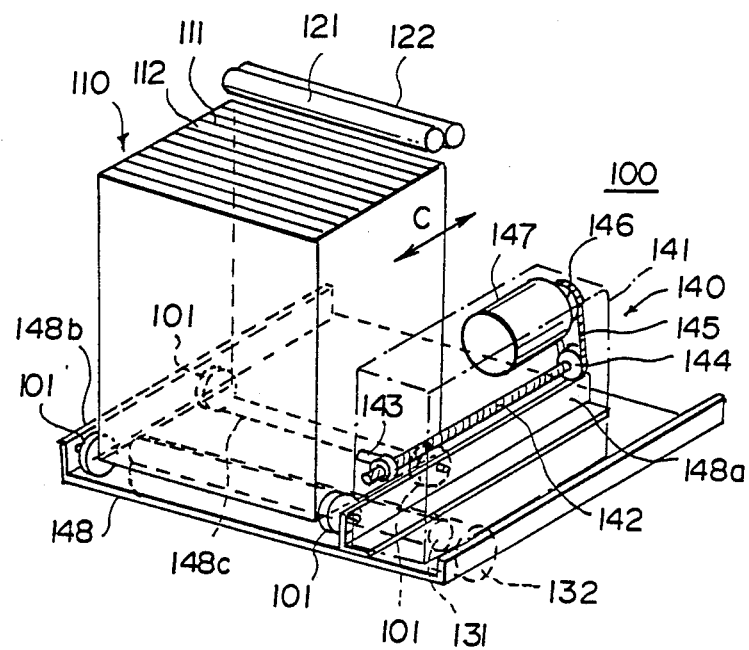
FIG. 7 is a perspective view showing another embodiment of the stacker for stimulable phosphor sheets in accordance with the present invention.

FIG. 7 is a perspective view showing the embodiment of the first stacker 100. The first stacker 100 is constituted in the same manner as the first stacker 100 mentioned above with reference to FIGS. 1 to 6, except for the configuration of the lower part. It may occur that the sheets of, by way of example, two different sizes are sequentially fed to the sheet housing compartment 112. The regulation of the sheet position in the width direction by the sheet position adjusting plates 117, 117 is adapted to the larger sheet.

In this embodiment, at the time the sheet 1 is to be discharged from the stacker body 110, the stacker body 110 is moved by the movement means 140 until the sheet housing compartment 112 that houses the sheet 1 which is to be fed out is brought above the feed-out rollers 131 and 132. Feeding-out of the sheet 1 from the stacker body 110 will be described hereinbelow with reference to FIGS. 8, 9 and 10.

Figure 8:
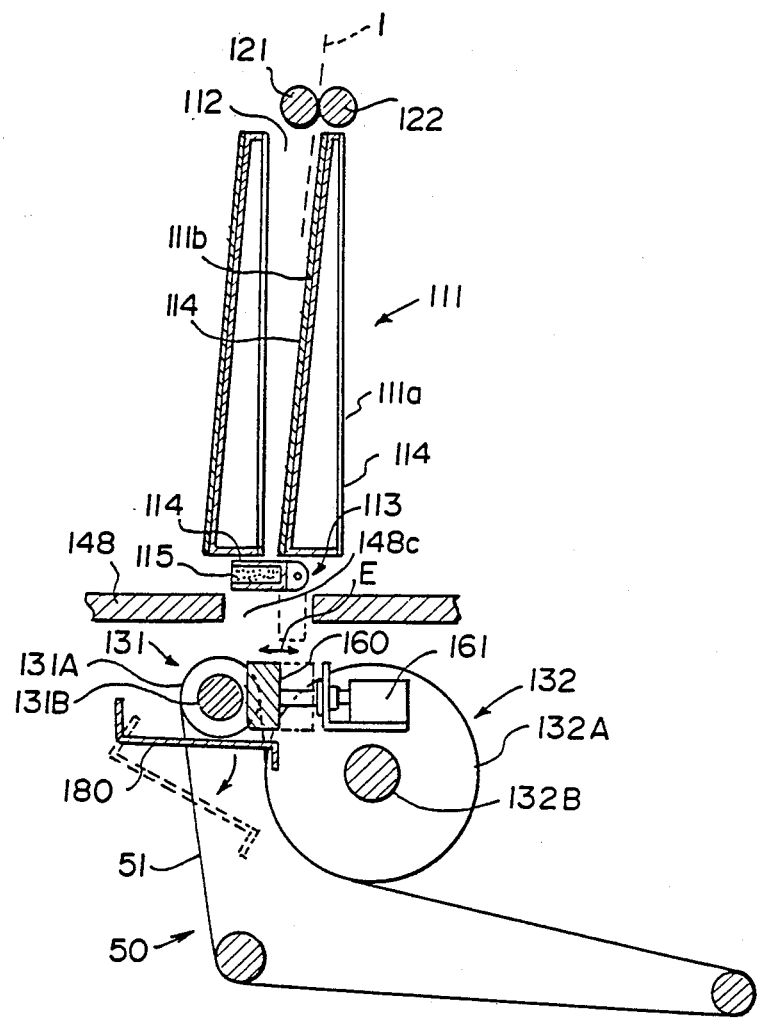
FIG. 8 is a sectional view showing the major part of the stacker shown in FIG. 7.
Figure 9:
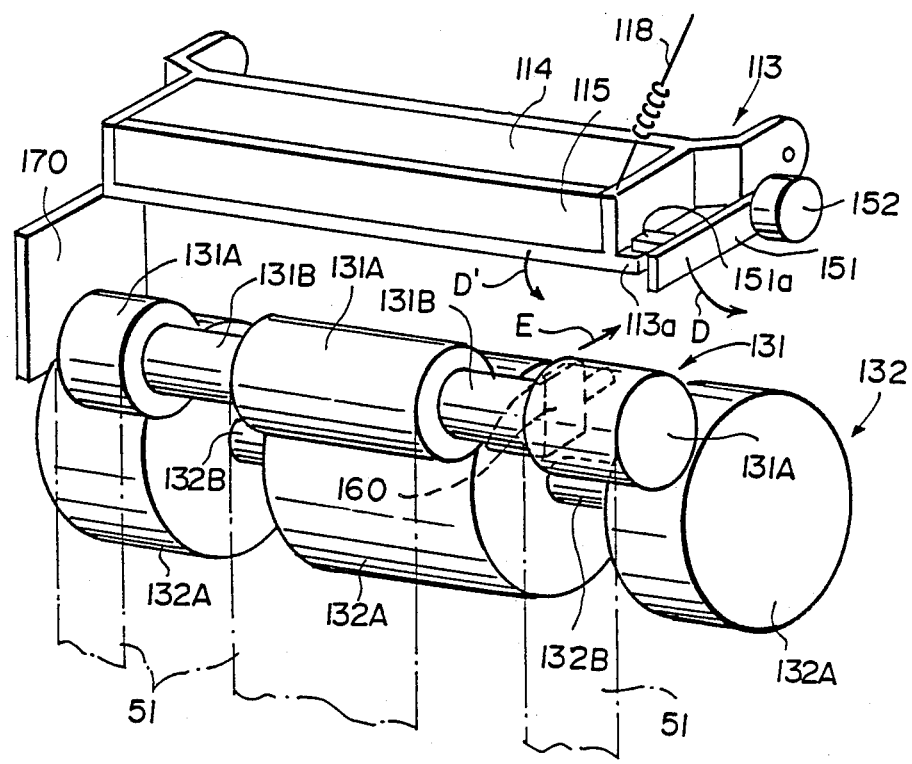
FIG. 9 is a perspective view showing the bottom plate and the feed-out rollers of the stacker shown in FIG. 7.

As shown in FIGS. 4 and 9, the bottom plate 113 is connected with the partition plate 111 by the springs 118, 118, and is normally maintained at the first position by the urging force of the springs 118, 118. On the other hand, the protrusion 113a is formed on a side edge of the bottom plate 113. Also, as shown in FIG. 9, the lever 151 having a protrusion 151a and rotatable by a drive means 152 constituted by a rotary solenoid or the like in the direction as indicated by the arrow D is provided in the vicinity of the protrusion 113a. At the time the sheet 1 is to be discharged from the sheet housing compartment 112, the protrusion 151a of the lever 151 is engaged with the protrusion 113a of the bottom plate 113, and the lever 151 is rotated in the direction as indicated by the arrow D, thereby to rotate the bottom plate 113 in the direction as indicated by the arrow D' with the spring 118 being expanded. As a result, the bottom plate 113 is moved to its second position as indicated by the broken line in FIG. 8, and the sheet 1 in the sheet housing compartment 112 is allowed to fall by its weight. The feed-out rollers 131 and 132 grasp the leading edge of the falling sheet 1. The feed-out rollers 131 and 132 are formed integrally with the sheet conveyance means 50. As shown in FIG. 9, the feed-out roller 131 is composed of roller bodies 131A, 131A, 131A having a predetermined diameter and reduced-diameter parts 131B, 131B formed among the roller bodies 131A, 131A, 131A, and the feed-out roller 132 is composed of roller bodies 132A, 132A, 132A having a predetermined diameter and reduced-diameter parts 132B, 132B formed among the roller bodies 132A, 132A, 132A. Belts 51, 51, 51 of the sheet conveyance means 50 are applied around the roller bodies 131A, 131A, 131A of the feed-out roller 131, and the sheet 1 discharged from the stacker body 110 is conveyed by the belts 51, 51, 51.

Figure 10:
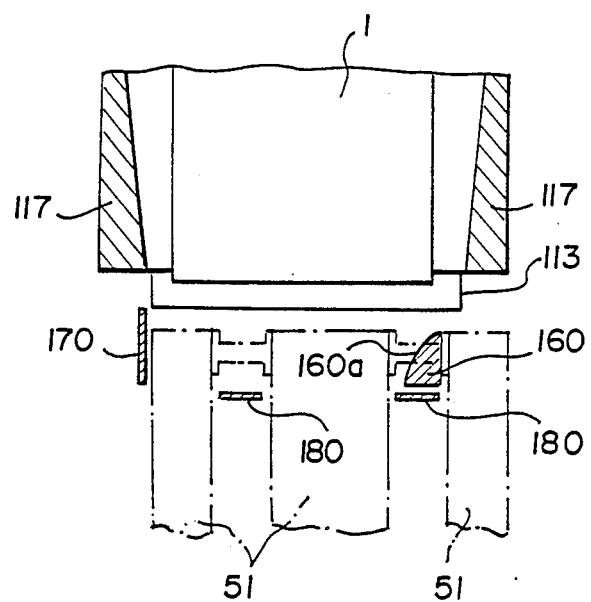
FIG. 10 is a sectional view showing the relationship among the positions of the fed-out stimulable phosphor sheet, the regulation plate, the sheet position adjusting member and the stopper.

As mentioned above, in this embodiment, either one of the sheets 1, 1 of two different sizes may be fed into and housed in the sheet housing compartment 112 of the stacker body 110. As for the larger sheet 1, the position of the sheet 1 is adjusted by the sheet position adjusting plates 117, 117, and therefore the sheet 1 can be accurately positioned in the width direction also at the time of sheet feed-out. However, in the case of the smaller sheet 1, the sheet position in the width direction fluctuates at the time of sheet feed-out, and cannot be disposed at the predetermined position at the read-out section 20. To eliminate this problem, in this embodiment of the first stacker 100, a regulation plate 170 is provided in the vicinity of one side edge of the stacker body 110 between the stacker body 110 and the feed-out rollers 131 and 132, and a sheet position adjusting member 160 is provided below the stacker body 110 in the vicinity of the other side edge of the stacker body 110, thereby to accurately adjust the position of the smaller sheet 1 in the course of sending of the sheet 1 to the read-out section 20. As shown in FIG. 8, the sheet position adjusting member 160 is moved by a linear type solenoid 161 in the direction of movement of the stacker body 110 as indicated by the arrow E between a first position as indicated by the solid line to receive the sheet 1 falling from the stacker body 110, and a second position as indicated by the broken line retracted from the falling position of the sheet 1. Also, as shown in FIG. 10, the regulation plate 170 is provided on the extension of the lower edge of the inner surface of one of the sheet position adjusting plates 117, 117.

In the case where the size of the sheet 1 discharged from the sheet housing compartment 112 is large, the sheet position adjusting member 160 is retracted to its second position. On the other hand, in the case where the size of the sheet 1 discharged from the sheet housing compartment 112 is small, the sheet position adjusting member 160 is moved to its first position. As shown in FIG. 10, the sheet position adjusting member 160 has a tapered surface 160a gradually projecting toward the regulation plate 170 in the downward direction. At the time the small sheet 1 falls from the sheet housing compartment 112, the sheet 1 is gradually shifted by the tapered surface 160a toward the regulation plate 170, and the position of the sheet 1 is adjusted to the predetermined position by the lower edge of the tapered surface 160a and the regulation plate 170. In the case where the leading edge of the sheet 1 becomes oblique in the direction normal to the direction of falling of the sheet 1 at the time the sheet 1 is allowed to fall, the sheet 1 is thereafter conveyed in the oblique orientation. To eliminate this problem, a stopper 180 for adjusting the orientation of the leading edge of the sheet 1 is provided below the sheet position adjusting member 160. At the time the sheet 1 is discharged from the sheet housing compartment 112, the stopper 180 is maintained at the position as indicated by the solid line in FIG. 8 to support the leading edge of the sheet 1. After the leading edge of the sheet 1 contacts the stopper 180 and the orientation of the leading edge is adjusted, the stopper 180 is rotated to the position as indicated by the broken line in FIG. 8 to allow the sheet 1 to be conveyed by the sheet conveyance means 50. In the case where there is no risk of the sheet 1 becoming oblique at the time of falling from the sheet housing compartment 112, the stopper 180 may be omitted. When feed-out of the sheet 1 from the sheet housing compartment 112 has been finished in the manner as mentioned above, the lever 151 is returned to the position as shown in FIG. 9, and the bottom plate 113 is returned to the position as indicated by the solid line in FIG. 8 by the returning force of the spring 118.

With the embodiment of the first stacker 100 in accordance with the present invention as mentioned above with reference to FIGS. 7 to 10, the sheets 1, 1, ... sequentially fed into the sheet housing compartments 112, 112, ... can be fed out of the sheet housing compartments 112, 112, ... one by one in every sequence regardless of the sequence of feed-in of the sheets 1, 1, ... Also, a specific sheet 1 can be preferentially fed out of the sheet housing compartment 112 by the feed-out rollers 131 and 132 immediately after the sheet 1 has been fed into the sheet housing compartment 112 by the feed-in rollers 121 and 122. Further, each of the sheet housing compartments 112, 112, ... is capable of housing therein both the large and small sheets 1, 1, and the sheet 1 of every size taken out of the cassette holding section 10 can be housed in the first stacker 100 insofar as there is an empty sheet housing compartment 112 in the first stacker 100. Also, with the first stacker 100 wherein the regulation plate 170 and the sheet position adjusting member 160 are provided for adjusting the position of the sheet 1 while the sheet 1 is falling by its weight from the sheet housing compartment 112, the position of the small sheet 1 can be adjusted accurately as in the case of the large sheet 1. In this embodiment, positions of the sheets 1, 1 of two different sizes are adjusted in the sheet width direction. However, adjustment of sheet positions can be achieved for the sheets of three or more different sizes by providing, besides the regulation plate 170 and the sheet position adjusting member 160, the sheet position adjusting member 116 as shown in FIG. 4 which is to be inserted into the sheet housing compartment 112 for reducing the effective width of the sheet housing compartment 112, and providing the sheet position adjusting member 160 more inward than the sheet position adjusting member 116. Further, in the case where the sheet position adjusting member 160 is formed moveable in the width direction of the sheet 1 and the movement thereof is carried out in many steps, adjustment of sheet positions can be achieved for the sheets of three or more different sizes by use of the sheet position adjusting member 160 alone.

The sheet 1 discharged from the first stacker 100 with the sheet position being adjusted accurately in the manner as mentioned above is conveyed by the sheet conveyance means 50 in the direction as indicated by the arrow A2 in FIG. 1 to the read-out section 20.

In the embodiment just mentioned above, though not shown in FIG. 1, the second stacker 200 is provided with a regulation plate and a sheet position adjusting member as in the case of the first stacker 100. The feed-out rollers 231 and 232 are formed integrally with the sheet conveyance means 50, and the sheet conveyance means 50 conveys the erased reusable sheet 1 discharged from the second stacker 200 into the empty cassette 2 at the cassette holding section 10. The position of the erased reusable sheet 1 thus conveyed into the empty cassette 2 is accurately adjusted regardless of the sheet size at the time the erased reusable sheet 1 is discharged from the second stacker 200, and therefore the erased reusable sheet 1 can be smoothly fed into the cassette 2.

The embodiment of the stacker 200 in accordance with the present invention wherein the regulation plate and the sheet position adjusting member are provided is disposed between the erasing section 30 and the cassette holding section 10 in the radiation image read-out apparatus provided with the erasing section 30. In this case, even though the cassettes 2, 2, ... housing the image-recorded sheets 1, 1, ... of different sizes are fed sequentially to the cassette holding section 10, the cassette 2 need not be made to wait at the cassette holding section 10 until the sheet 1 taken out of the cassette 2 is returned to the cassette 2, but instead a new sheet 1 can immediately be conveyed into the empty cassette 2. Therefore, the sheets 1, 1, ... can be circulated and reused efficiently.

The configuration of the stacker for stimulable phosphor sheets in accordance with the present invention is not limited to the one mentioned above with reference to FIGS. 7 to 10. For example, the partition plate need not necessarily be provided upright in an approximately vertical direction and may stand obliquely insofar as the sheet 1 is allowed to fall by its weight at the time the bottom plate is opened. Also, instead of moving the stacker body 110, selection of the sheet housing compartment 112 at which the sheet 1 is to be fed-in or fed-out may be carried out by fixing the stacker body 110 and moving the feed-in means and the feed-out means. In this case, the regulation plate 170 and the sheet position adjusting member 160 may be formed moveable integrally with the feed-out means.

A further embodiment of the stacker for stimulable phosphor sheets in accordance with the present invention will hereinbelow be described with reference to FIGS. 11 to 14. In FIGS. 11 to 14, similar elements are numbered with the same reference numerals with respect to FIGS. 1 to 6.

Figure 11:
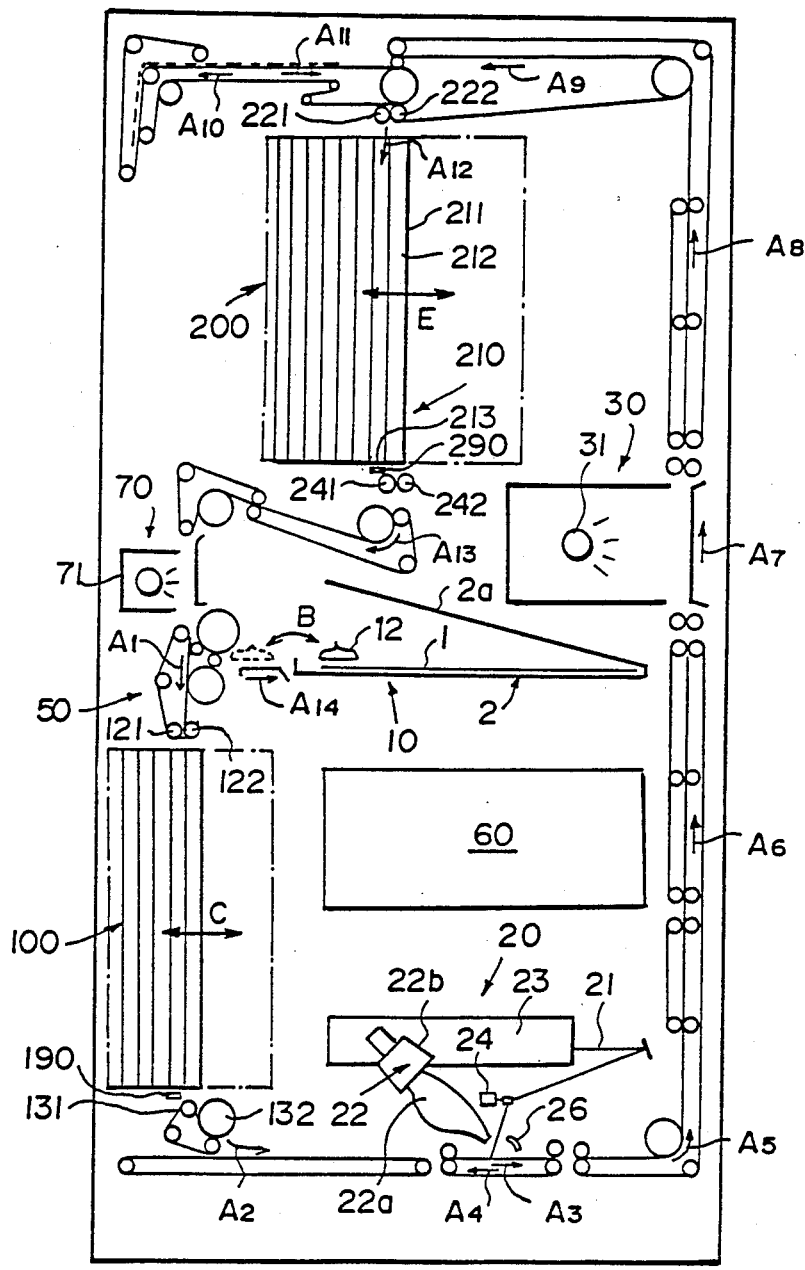
FIG. 11 is a schematic side view showing the radiation image read-out apparatus wherein a further embodiment of the stacker for stimulable phosphor sheets in accordance with the present invention is employed.
Figure 12:
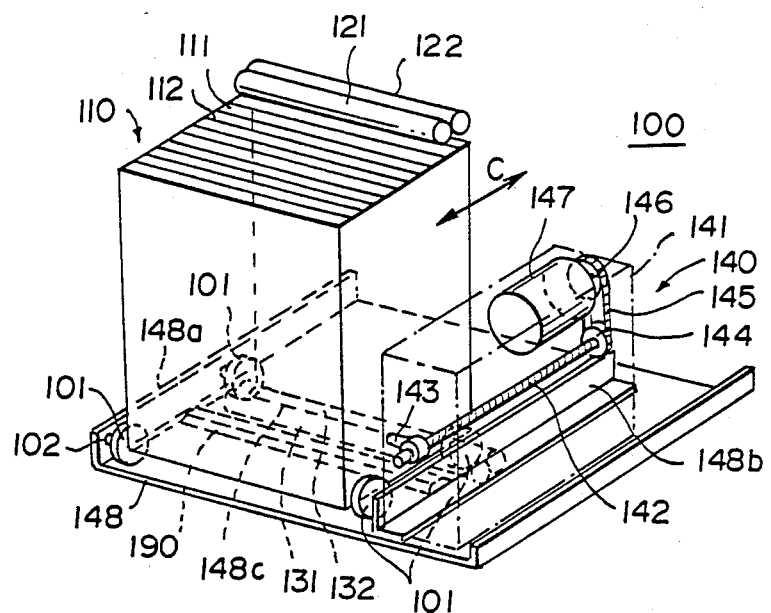
FIG. 12 is a perspective view showing the stacker employed in FIG. 11.

FIG. 11 schematically shows the radiation image read-out apparatus wherein the embodiment of the stacker for stimulable phosphor sheets in accordance with the present invention is employed, and FIG. 12 shows the configuration of the embodiment of the first stacker 100. In this embodiment, the stacker body 110 is moveable within the range as indicated by the chain line in FIG. 11 in the direction as indicated by the arrow C. Also, the feed-in rollers 121 and 122 on one hand and the feed-out rollers 131 and 132 on the other hand are deviated in position from each other by a distance equal to the space of a single sheet housing compartment 112 in the direction as indicated by the arrow C so that they can respectively face the sheet housing compartments 112, 112 adjacent to each other of the stacker body 110 stopped at a predetermined position.

Figure 13:
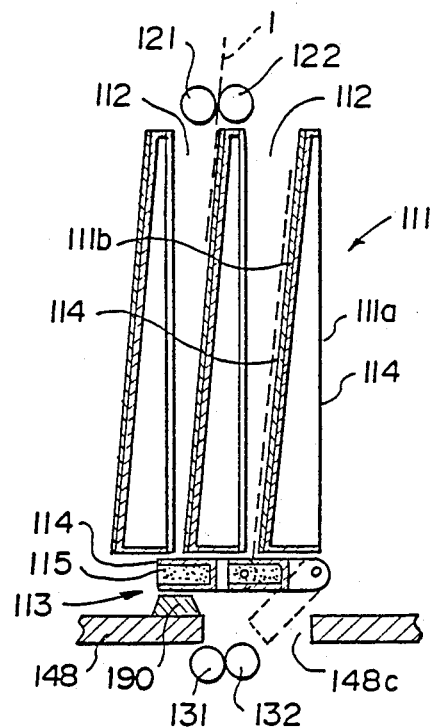
FIG. 13 is a sectional view showing the major part of the stacker employed in FIG. 11.

In this embodiment, the stacker body 110 is constituted as shown in FIGS. 4, 6 and 13. With reference to FIG. 13, a stopper 190 for preventing the bottom plate 113 from being opened by the falling impact of the sheet 1 is provided below the bottom plate 113 that receives the leading edge of the sheet 1 fed into the sheet housing compartment 112. Therefore, even though the sheet 1 falls with comparatively strong force onto the bottom plate 113, the bottom plate 113 is not caused to open by expansion of the spring 118, and the sheet 1 does not fall from the sheet housing compartment 112 at this time and can be securely housed in the sheet housing compartment 112.

Feed-in of the sheet 1 into the stacker body 110 is carried as mentioned above, and the sheets 1, 1, ... sequentially housed in this manner in the stacker body 110 are taken one by one out of the stacker body 110, transferred to the sheet conveyance means 50 and sent to the read-out section 20. Feed-out of the sheet 1 from the stacker body 110 is carried out at the sheet housing compartment 112 that is brought above the feed-out rollers 131 and 132. As mentioned above, the feed-in rollers 121 and 122 on one hand and the feed-out rollers 131 and 132 on the other hand are deviated in position from each other by a distance equal to the space of a single sheet housing compartment 112, and therefore feed-in and feed-out of the sheets 1, 1 at the stacker body 110 can be carried out simultaneously with each other. Specifically, at the time the sheet 1 is to be fed out of the stacker body 110, the stacker body 110 is moved until the sheet housing compartment 112 that houses the sheet 1 which is to be fed out is brought to the aforesaid feed-out position. Then, the bottom plate 113 is rotated by the lever 151 to the second position. At this time, in the case where the sheet housing compartment 112 which is adjacent to said sheet housing compartment 112 from which the sheet 1 is to be fed out and which is positioned below the feed-in rollers 121 and 122 is empty, feed-in of a sheet 1 into said adjacent sheet housing compartment 112 can be carried out simultaneously with the feed-out of the aforesaid sheet 1 from the sheet housing compartment 112 brought to the feed-out position. The feed-out rollers 131 and 132 are provided below the bottom plate 113 at the feed-out position. Also, as shown in FIGS. 12 and 13, the slit 148c through which the sheet 1 discharged from the stacker body 110 is to pass is formed in the base plate 148 at the position between the stacker body 110 and the feed-out rollers 131 and 132. As the bottom plate 113 is opened to the position as indicated by the broken line in FIG. 13, the sheet 1 falls by its weight, and the leading edge of the sheet 1 is grasped between the feed-out rollers 131 and 132, which transfer the grasped sheet 1 to the sheet conveyance means 50 in the vicinity of the feed-out rollers 131 and 132.

With the embodiment of the first stacker 100 in accordance with the present invention as mentioned above with reference to FIGS. 11, 12 and 13, the sheets 1, 1, ... sequentially fed into the sheet housing compartments 112, 112, ... can be fed out of the sheet housing compartments 112, 112, ... one by one in every sequence regardless of the sequence of feed-in of the sheets 1, 1, ... Also, a specific sheet 1 can be preferentially fed out of the sheet housing compartment 112 by the feed-out rollers 131 and 132 immediately after the sheet 1 has been fed into the sheet housing compartment 112 by the feed-in rollers 121 and 122. Also, in the case where the sizes of the fed-in sheets 1, 1, ... are determined in advance for the respective sheet housing compartments 112, 112, ... or the sizes of the sheets 1, 1, ... fed into the sheet housing compartments 112, 112, ... are stored in a memory, the sheet 1 of a desired size can be taken out of the corresponding sheet housing compartment 112 and sent to the read-out section 20. Further, with the first stacker 100 wherein the feed-in rollers 121 and 122 on one hand and the feed-out rollers 131 and 132 on the other hand are deviated in position from each other to face the sheet housing compartments 112, 112 adjacent to each other, feed-in and feed-out of the sheets 1, 1 can be carried out simultaneously with each other, and therefore a plurality of the sheets 1, 1, ... can be moved efficiently in the radiation image read-out apparatus. Also, with this embodiment of the first stacker 100 wherein the partition plates 111, 111, ... in the stacker body 110 are provided side by side approximately upright and the stacker body 110 as a whole stands without inclining obliquely, the movement range of the first stacker 100 can be minimized.

As shown in FIG. 11, the sheet 1 discharged from the first stacker 100 in the manner as mentioned above is transferred by the feed-out rollers 131 and 132 to the sheet conveyance means 50, which conveys the sheet 1 in the direction as indicated by the arrow A2 to the read-out section 20.

The second stacker 200 shown in FIG. 11 has the same configuration as the first stacker 100. Feed-out rollers 241 and 242 as the feed-out means for the sheet 1 are provided below the stacker body 210 so that they are deviated in position by a distance equal to the space of a single sheet housing compartment 212 from the feed-in rollers 221 and 222. Also with the second stacker 200, feed-in and feed-out of the sheets 1, 1 at the stacker body 210 are carried out for the sheet housing compartments 212, 212 adjacent to each other. Also, a stopper 290 is provided below the bottom plate 213 that is disposed at the sheet feed-in position. The feed-out rollers 241 and 242 receive the sheet 1 fed out of the stacker body 210, and transfer the sheet 1 to the sheet conveyance means 50 which conveys the sheet 1 into the empty cassette 2 fed to the cassette holding section 10. A plurality of the sheets 1, 1, . . . have been housed in the second stacker 200 before said sheet 1 is fed thereinto. Specifically, sheet feed-out from the second stacker 200 is carried out by the same mechanism as in the case of the first stacker 100, and every sheet 1 can be selectively fed out of the second stacker 200. Also, as in the case of the first stacker 100, the sheet feeding into the second stacker 200 can be carried out simultaneously with the sheet feeding out from the second stacker 00.

The embodiment of the stacker 200 in accordance with the present invention shown in FIG. 11 is disposed between the erasing section 30 and the cassette holding section 10 in the radiation image read-out apparatus provided with the erasing section 30. In this case, even though the cassettes 2, 2, . . . housing the image-recorded sheets 1, 1, . . . of different sizes are fed sequentially to the cassette holding section 10, the cassette 2 need not be made to wait at the cassette holding section 10 until the sheet 1 taken out of the cassette 2 is returned to the cassette 2, but instead a new sheet 1 can immediately be conveyed into the empty cassette 2. Therefore, the sheets 1, 1, . . . can be circulated and reused efficiently.

Figure 14:
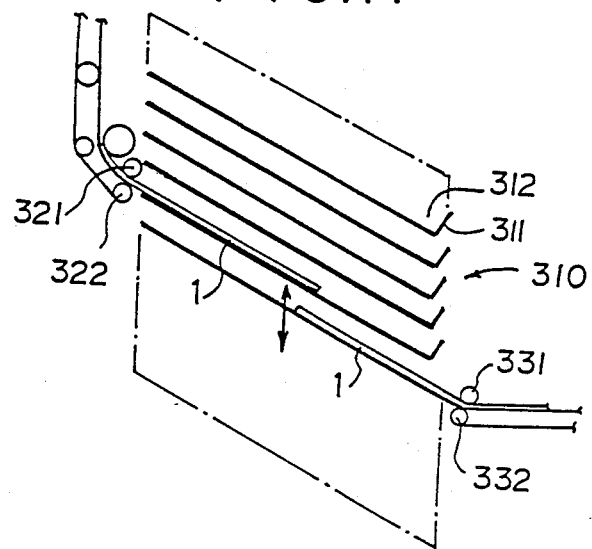
FIG. 14 is a schematic view showing a still further embodiment of the stacker for stimulable phosphor sheets in accordance with the present invention.

In the embodiment shown in FIG. 11, sheet feed-in and feed-out are carried out at the positions deviated by a distance equal to the space of a single sheet housing compartment. However, the feed-in position and the feed-out position may be deviated by a distance equal to two or more sheet housing compartments. Also, the configuration of the stacker is not limited to a particular one insofar as the sheets 1, 1, . . . can be housed one by one in the sheet housing compartments formed among the partition plates and can be fed in and out in every sequence. For example, as shown in FIG. 14, a stacker body 310 may be provided with partition plates 311, 311, . . . disposed one above another and inclined to such an extent that the sheets 1, 1, . . . can fall by their weight, and may be moved vertically to select sheet housing compartments 312, 312 at which feed-in and feed-out of the sheets 1, 1 are to be carried out. In this case, feed-in rollers 321 and 322 on one hand and the feed-out rollers 331 and 332 on the other hand are deviated in position vertically so that feed-in and feed-out of the sheets 1, 1 are carried out simultaneously with each other. Also, in this embodiment, the sliding members and the cushioning material, and the recesses and protrusions on the surfaces of the partition plates may be omitted in accordance with the configuration of the stacker body.

The stopper 190 provided in the embodiment shown in FIG. 11 will hereinbelow be described in more detail. The partition plates 111, 111, . . . are approximately upright as a whole. Therefore, at the time the sheet 1 falls by its weight onto the bottom plate 113 in the course of feeding of the sheet 1 into the sheet housing compartment 112, large falling force of the sheet 1 is applied to the bottom plate 113 in the direction opening the bottom plate 113. Since the bottom plate 113 is merely urged by the spring 118 to the first position, it is considered that the bottom plate 113 is opened downward by the falling impact of the sheet 1 and allows the fed-in sheet 1 to fall from the bottom plate 113. Accordingly, as shown in FIG. 13, the first stacker 100 is provided with the stopper 190 below the bottom plate 113 brought to the sheet feed-in position so that the stopper 190 faces the feed-in rollers 121 and 122 via the sheet housing compartment 112, thereby to prevent the bottom plate 113 from being opened at the time of sheet feed-in. In this embodiment, the feed-in rollers 121 and 122 and the feed-out rollers 131 and 132 are disposed to face respectively the sheet housing compartments 112, 112 adjacent to each other, and the sheet feed-in position and the feed-out position are deviated by a distance equal to the space of a single sheet housing compartment 112. Therefore, the stopper 190 does not interfere with the sheet feed-out. The stopper 190 is secured to the base plate 148 at the position facing the feed-in rollers 121 and 122.

With the embodiment wherein the stopper 190 is provided, even though the sheet 1 falls onto the bottom plate 113 and causes the bottom plate 113 to be rotated downward, the bottom plate 113 contacts the stopper 190 and is prevented from rotating. Therefore, the sheet 1 is secured held in the sheet housing compartment 112. The stopper 190 may be of any type insofar as it can prevent the bottom plate 113 from rotating, and may be an ordinary rigid stopper or a damper capable of absorbing the falling impact of the sheet 1.

Figure 15:
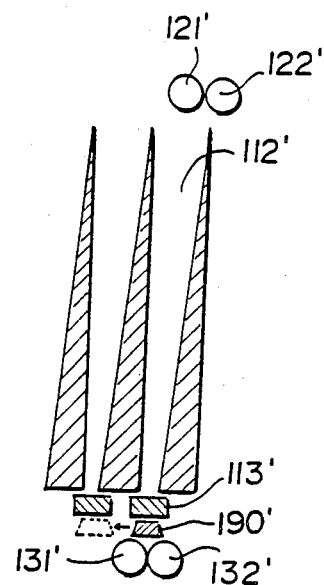
FIG. 15 is a schematic sectional view showing the major part of another embodiment of the stacker for stimulable phosphor sheets in accordance with the present invention.
Figure 16:
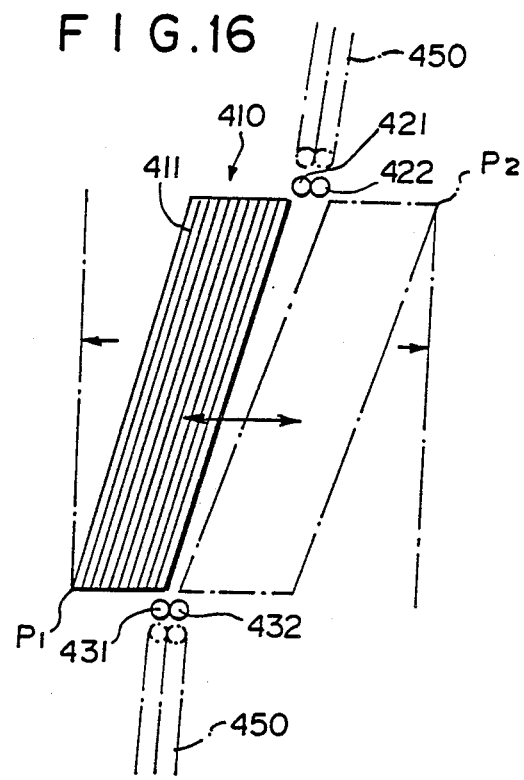
FIG. 16 is a schematic view showing the conventional stacker.

In the embodiment of the stacker for stimulable phosphor sheets in accordance with the present invention wherein the stopper 190 is provided, sheet feed-in and feed-out may be carried out at the same position. Specifically, as shown in FIG. 15, feed-in rollers 121' and 122' and the feed-out rollers 131' and 132' may be provided to face the same single sheet housing compartment 112'. In this case, if a stopper 190 is secured at the position facing the feed-in rollers 121' and 122', the stopper 190' will interfere with the rotation of a bottom plate 113' at the time of sheet feed-out. Therefore, the stopper 190' is formed moveable and is moved to the position facing the feed-in rollers 121' and 122' only at the time of sheet feed-in. Also, instead of moving the stacker body, selection of the sheet housing compartment at which sheet feed-in and feed-out are to be carried out may be carried out by fixing the stacker body and moving the feed-in means and the feed-out means. In this case, the stopper may be formed moveable integrally with the feed-in means or independently of the feed-in means.

The configuration of the stacker provided with the aforesaid stopper is not limited to the one as mentioned above. For example, the surfaces of the partition plates need not necessarily be tapered in the case where no problem arises with the sheet feed-in. Also, the member for integrally supporting a plurality of the partition plates from side edges of the partition plates and the member for adjusting the sheet position may be provided independently of each other.

We claim:

1. In a radiation image read-out apparatus for reading out a radiation image stored on a stimulable phosphor sheet, a stacker for stimulable phosphor sheets provided in a conveyance path of a sheet conveyance means for conveying said stimulable phosphor sheet and capable of housing therein a plurality of stimulable phosphor sheets and discharging the housed stimulable phosphor sheets one by one, the stacker for stimulable phosphor sheets comprising:
  (i) a stacker body provided with:
    (a) a plurality of partition plates disposed approximately upright in parallel relation to one another, each of which has an approximately vertical back surface and a front surface tapered so that said front surface is gradually projected forward in the downward direction, said partition plates being disposed in parallel relation to one another with a space, into which said stimulable phosphor sheet is to enter from above, intervening therebetween, and
    (b) bottom plates each of which is provided at the lower end of each of said partition plates and moveable between a first position to receive the lower edge of said stimulable phosphor sheet entering between said partition plates and hold said stimulable phosphor sheet and a second position moved from said first position to allow said stimulable phosphor sheet to fall by its weight,
  (ii) a feed-in means provided above said stacker body for feeding said stimulable phosphor sheets conveyed by said sheet conveyance means into said stacker body,
  (iii) a feed-out means provided below said stacker body for receiving said stimulable phosphor sheet falling by its weight and transferring said stimulable phosphor sheet to said sheet conveyance means, and
  (iv) a movement means for moving said stacker body so that every space between said partition plates in said stacker body can be brought below said feed-in means and above said feed-out means.

2. A stacker for stimulable phosphor sheets as defined in claim 1 wherein said stacker body is provided with sheet position adjusting plates for supporting both edges of each of said partition plates, said sheet position adjusting plates being projected inward towards said partition plates in the downward direction.

3. A stacker for stimulable phosphor sheets as defined in claim 1 or 2 wherein said stacker body is provided with a sheet position adjusting member for insertion into the space between said partition plates and decreasing the effective width of said space between said partition plates.

4. A stacker for stimulable phosphor sheets as defined in claim 1 wherein said movement means is provided with guide members extending in the direction of movement of said stacker body in contact with both sides of said stacker body, thereby to guide the movement of said stacker body.

5. A stacker for stimulable phosphor sheets as defined in claim 1 wherein said movement means moves said stacker body with respect to said feed-in means and said feed-out means which are fixed at predetermined positions.

6. A stacker for stimulable phosphor sheets as defined in claim 1 wherein each of said bottom plates is provided with a cushioning material on the surface.

7. In a radiation image read-out apparatus for reading out a radiation image stored on a stimulable phosphor sheet, a stacker for stimulable phosphor sheets provided in a conveyance path of a sheet conveyance means for conveying said stimulable phosphor sheet and capable of housing therein a plurality of stimulable phosphor sheets and discharging the housed stimulable phosphor sheets one by one, the stacker for stimulable phosphor sheets comprising:
  (i) a stacker body provided with:
    (a) a plurality of partition plates standing in approximately parallel relation to one another with a predetermined space, into which said stimulable phosphor sheet is to enter, intervening therebetween, and
    (b) bottom plates each of which is provided at the lower end of each of said partition plates and moveable between a first position to receive the lower edge of said stimulable phosphor sheet entering between said partition plates and hold said stimulable phosphor sheet and a second position moved from said first position to allow said stimulable phosphor sheet to fall by its weight,
  (ii) a feed-in means provided above said stacker body for feeding said stimulable phosphor sheets conveyed by said sheet conveyance means into said stacker body,
  (iii) a feed-out means provided below said stacker body for receiving said stimulable phosphor sheets one by one from said stacker body and transferring said stimulable phosphor sheets to said sheet conveyance means,
  (iv) a movement means for moving said stacker body with respect to said feed-in means and said feed-out means so that every space between said partition plates in said stacker body can face said feed-in means and said feed-out means,
  (v) a regulation plate provided in the vicinity of one side edge of said stacker body between said feed-out means and said stacker body, and
  (vi) a sheet position adjusting member moveable between a first position in the vicinity of the other side edge of said stacker body between said feed-out means and said stacker body, and a second position retracted from the position between said feed-out means and said stacker body, said sheet position adjusting member having a surface tapered so that said surface is gradually projected toward said regulation plate in the downward direction.

8. A stacker for stimulable phosphor sheets as defined in claim 7 wherein said stacker body is provided with sheet position adjusting plates for supporting both edges of each of said partition plates, said sheet position adjusting plates being projected inward towards said partition plates in the downward direction.

9. A stacker for stimulable phosphor sheets as defined in claim 7 or 8 wherein said stacker body is provided with a sheet position adjusting member for insertion into the space between said partition plates and decreasing the effective width of said space between said partition plates.

10. A stacker for stimulable phosphor sheets as defined in claim 7 wherein said movement means is provided with guide members extending in the direction of movement of said stacker body in contact with both sides of said stacker body, thereby to guide the movement of said stacker body.

11. A stacker for stimulable phosphor sheets as defined in claim 7 wherein a stopper is provided below said sheet position adjusting member for adjusting the orientation of the leading edge of said stimulable phosphor sheet.

12. A stacker for stimulable phosphor sheets as defined in claim 7 wherein said movement means moves said stacker body with respect to said feed-in means and said feed-out means which are fixed at predetermined positions.

13. A stacker for stimulable phosphor sheets as defined in claim 7 wherein each of said bottom plates is provided with a cushioning material on the surface.

14. In a radiation image read-out apparatus for reading out a radiation image stored on a stimulable phosphor sheet, a stacker for stimulable phosphor sheets provided in a conveyance path of a sheet conveyance means for conveying said stimulable phosphor sheet and capable of housing therein a plurality of stimulable phosphor sheets and discharging the housed stimulable phosphor sheets one by one, the stacker for stimulable phosphor sheets comprising:
  (i) a stacker body provided with a plurality of sheet housing compartments each of which is capable of housing therein a single stimulable phosphor sheet, said sheet housing compartments being formed by a plurality of partition plates disposed in approximately parallel relation to one another,
  (ii) a feed-in means provided on one side of said stacker body for feeding said stimulable phosphor sheets conveyed by said sheet conveyance means into said stacker body,
  (iii) a feed-out means provided on the other side of said stacker body for receiving said stimulable phosphor sheets one by one from said stacker body and transferring said stimulable phosphor sheets to said sheet conveyance means, and
  (iv) a movement means for moving said stacker body so that every sheet housing compartment in said stacker body can face said feed-in means and said feed-out means,
wherein said feed-in means and said feed-out means are deviated in position from each other so that said feed-in means and said feed-out means face said sheet housing compartments different from each other in said stacker body stopped at a predetermined position.

15. A stacker for stimulable phosphor sheets as defined in claim 14 wherein said stacker body is provided with sheet position adjusting plates for supporting both edges of each of said partition plates, said sheet position adjusting plates being projected inward towards said partition plates in the downward direction.

16. A stacker for stimulable phosphor sheets as defined in claim 14 or 15 wherein said stacker body is provided with a sheet position adjusting member for insertion into the space between said partition plates and decreasing the effective width of said space between said partition plates.

17. A stacker for stimulable phosphor sheets as defined in claim 14 wherein said movement means is provided with guide members extending in the direction of movement of said stacker body in contact with both sides of said stacker body, thereby to guide the movement of said stacker body.

18. A stacker for stimulable phosphor sheets as defined in claim 14 wherein said movement means moves said stacker body with respect to said feed-in means and said feed-out means which are fixed at predetermined positions.

19. A stacker for stimulable phosphor sheets as defined in claim 14 wherein each of said bottom plates is provided with a cushioning material on the surface.

20. In a radiation image read-out apparatus for reading out a radiation image stored on a stimulable phosphor sheet, a stacker for stimulable phosphor sheets provided in a conveyance path of a sheet conveyance means for conveying said stimulable phosphor sheet and capable of housing therein a plurality of stimulable phosphor sheets and discharging the housed stimulable phosphor sheets one by one, the stacker for stimulable phosphor sheets comprising:
  (i) a stacker body provided with:
    (a) a plurality of partition plates disposed upright approximately in the vertical direction in approximately parallel relation to one another with a predetermined space, into which said stimulable phosphor sheet is to enter, intervening therebetween, and
    (b) bottom plates each of which is provided at the lower end of each of said partition plates and moveable between a first position to receive the lower edge of said stimulable phosphor sheet entering between said partition plates and hold said stimulable phosphor sheet by being urged by a spring and a second position rotated downward from said first position by an opening means against the urging force of said spring to allow said stimulable phosphor sheet to fall by its weight,
  (ii) a feed-in means provided above said stacker body for feeding said stimulable phosphor sheets conveyed by said sheet conveyance means into said stacker body,
  (iii) a feed-out means provided below said stacker body for receiving said stimulable phosphor sheet falling by its weight and transferring said stimulable phosphor sheet to said sheet conveyance means,
  (iv) a movement means for moving said stacker body with respect to said feed-in means and said feed-out means so that every space between said partition plates in said stacker body can be brought below said feed-in means and above said feed-out means, and
  (v) a stopper disposed below said bottom plate that receives the lower edge of said stimulable phosphor sheet fed-in by said feed-in means, thereby to prevent said bottom plate from rotating from said first position, at least at the time said stimulable phosphor sheet is fed into said stacker body.

21. A stacker for stimulable phosphor sheets as defined in claim 20 wherein said movement means moves said stacker body with respect to said feed-in means and said feed-out means which are fixed at predetermined positions.

22. A stacker for stimulable phosphor sheets as defined in claim 20 wherein each of said bottom plates is provided with a cushioning material on the surface.

23. A stacker for stimulable phosphor sheets as defined in claim 20 wherein said stacker body is provided with sheet position adjusting plates for supporting both edges of each of said partition plates, said sheet position adjusting plates being projected inward towards said partition plates in the downward direction.

24. A stacker for stimulable phosphor sheets as defined in claim 20 or 23 wherein said stacker body is provided with a sheet position adjusting member for insertion into the space between said partition plates and decreasing the effective width of said space between said partition plates.

25. A stacker for stimulable phosphor sheets as defined in claim 20 wherein said movement means is provided with guide members extending in the direction of movement of said stacker body in contact with both sides of said stacker body, thereby to guide the movement of said stacker body.

* * * * *